(12) United States Patent
McCumber et al.

(10) Patent No.: US 6,933,037 B2
(45) Date of Patent: *Aug. 23, 2005

(54) TRIPLE LAMINATE ROOFING SHINGLE

(75) Inventors: Leonard D. McCumber, Dallas, TX (US); Randal J. Jolitz, Joplin, MO (US); Virginia K. Coleman, Joplin, MO (US)

(73) Assignee: Tamko Roofing Products, Joplin, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1122 days.

(21) Appl. No.: 08/933,160

(22) Filed: Sep. 18, 1997

(65) Prior Publication Data

US 2001/0049002 A1 Dec. 6, 2001

(51) Int. Cl.[7] .............................. B32B 5/30; E04D 1/26
(52) U.S. Cl. ........................... 428/143; 428/81; 428/56; 428/55; 428/51; 428/220; 428/77; 428/78; 428/79; 428/157; 428/189; 428/144; 428/145; 428/149; 428/150; 428/195; 428/206; 428/207; 428/208; 52/555; 52/554; 52/518; 52/540; 52/557; 52/560
(58) Field of Search ................................ 428/143, 144, 428/145, 149, 150, 195, 206, 207, 208, 81, 56, 55, 51, 220, 77, 78, 79, 157, 189; 52/555, 554, 518, 540, 557, 560

(56) References Cited

U.S. PATENT DOCUMENTS

| | | | |
|---|---|---|---|
| 891,501 A | * | 6/1908 | Overburg ...................... 52/555 |
| 1,153,418 A | | 9/1915 | Bird ............................. 52/518 |
| 1,593,095 A | | 7/1926 | Munro ......................... 52/553 |
| 1,596,272 A | | 8/1926 | Jordan .......................... 52/559 |
| 1,601,731 A | | 10/1926 | Flood ........................... 52/557 |
| 1,698,891 A | | 1/1929 | Overbury ...................... 29/412 |
| 1,705,497 A | | 3/1929 | Overbury ...................... 52/555 |
| 1,829,886 A | | 11/1931 | Yates et al. .................. 156/260 |
| 1,894,614 A | | 1/1933 | Wettlaufer .................... 52/521 |
| 1,894,615 A | | 1/1933 | Wettlaufer .................... 52/557 |

(Continued)

FOREIGN PATENT DOCUMENTS

CA 963626 3/1975

OTHER PUBLICATIONS

TAMKO "Heritage II" Advertisement, 1993, 2 pages.
Celotex "Presidential Shake" Advertisement, Mar. 1995, 6 pages.
TAMKO "Heritage" Advertisement, 1995, 8 pages.
GAF Materials Corporation "Grand Sequoia" Shingles Advertisement, 1996, 6 pages.
Celotex "Ambassador Shake" Advertisement, Jun. 1997, Contractors Guide, 1 page.

Primary Examiner—William P. Watkins, III
(74) Attorney, Agent, or Firm—Hitchcock Evert LLP

(57) ABSTRACT

A three-layer asphalt composition shingle where the top layer is of a full width, a middle layer is less than the full width, and a bottom layer has a width shorter than the middle layer. The middle and top layers of the shingle have tabs and cutouts. The tabs of each such layer generally differ in some feature. Moreover, the corresponding tabs between the middle layer and top layer also differ with respect to some feature, such as a lengthwise size, a widthwise size, shape or in color. Each of the three layers includes color zones, and often plural color zones. The different tab features and the different color features of the various layers provide a high degree of randomness to enhance a visual appearance to a roof shingled with such type of shingles.

2 Claims, 13 Drawing Sheets

U.S. PATENT DOCUMENTS

| | | | |
|---|---|---|---|
| 1,897,139 A | | 2/1933 | Overbury .................... 156/250 |
| 2,068,118 A | * | 1/1937 | Topping ...................... 52/555 |
| 2,199,760 A | * | 5/1940 | Schuetz ....................... 52/555 |
| 3,180,783 A | | 4/1965 | Walker et al. ................ 161/93 |
| 3,624,975 A | | 12/1971 | Morgan et al. ............... 52/105 |
| 3,921,358 A | | 11/1975 | Bettoli ........................ 52/314 |
| 3,998,685 A | | 12/1976 | Czyzewski et al. ......... 156/260 |
| D247,786 S | | 4/1978 | Flood .......................... D25/80 |
| 4,141,187 A | | 2/1979 | Graves ........................ 52/173 |
| 4,198,257 A | | 4/1980 | Pfaff ........................... 156/260 |
| 4,226,069 A | | 10/1980 | Hinds .......................... 52/521 |
| 4,233,100 A | | 11/1980 | Cunningham et al. ...... 156/260 |
| 4,274,243 A | | 6/1981 | Corbin et al. ................ 52/748 |
| 4,284,470 A | | 8/1981 | Bondoc ....................... 162/123 |
| 4,295,445 A | | 10/1981 | Kopenhaver ................ 118/695 |
| 4,322,928 A | | 4/1982 | Freiborg ...................... 52/521 |
| 4,352,837 A | | 10/1982 | Kopenhaver ................ 427/187 |
| 4,499,702 A | * | 2/1985 | Turner ......................... 52/555 |
| 4,523,543 A | | 6/1985 | Brady et al. ................. 118/697 |
| 4,559,267 A | | 12/1985 | Freshwater et al. ......... 428/352 |
| 4,634,622 A | | 1/1987 | Jenkins et al. .............. 428/143 |
| 4,668,315 A | | 5/1987 | Brady et al. ................. 156/71 |
| 4,717,614 A | | 1/1988 | Bondoc et al. ............. 428/143 |
| 4,729,814 A | | 3/1988 | Jennus et al. ............... 156/512 |
| 4,775,440 A | | 10/1988 | Jennus et al. ................ 156/260 |
| 4,795,661 A | | 1/1989 | Bondoc et al. ............. 427/187 |
| 4,825,616 A | | 5/1989 | Bondoc et al. ............... 52/518 |
| 4,848,057 A | | 7/1989 | MacDonald et al. .......... 52/518 |
| 4,860,509 A | | 8/1989 | Laaly et al. .................. 52/173 |
| 4,869,942 A | | 9/1989 | Jennus et al. ................. 428/77 |
| 4,900,589 A | | 2/1990 | Montgomery ............... 427/188 |
| 4,920,721 A | | 5/1990 | Pressutti et al. ............... 52/518 |
| D309,027 S | | 7/1990 | Noone et al. .............. D25/139 |
| 5,052,162 A | | 10/1991 | Bush et al. .................... 52/518 |
| 5,186,980 A | | 2/1993 | Koschitzky ................. 427/187 |
| 5,195,290 A | | 3/1993 | Hulett .......................... 52/518 |
| 5,209,802 A | | 5/1993 | Hannah et al. ............. 156/250 |
| 5,347,785 A | | 9/1994 | Terrenzio et al. ............ 52/555 |
| 5,369,929 A | | 12/1994 | Weaver et al. ................ 52/557 |
| 5,421,134 A | | 6/1995 | Hannah et al. ................ 52/518 |
| D366,124 S | | 1/1996 | Hannah et al. ............. D25/139 |
| 5,547,707 A | | 8/1996 | Haubert et al. ............. 427/188 |
| 5,571,596 A | | 11/1996 | Johnson ...................... 428/143 |
| 5,853,858 A | * | 12/1998 | Bondoc ........................ 52/555 |
| 5,860,263 A | | 1/1999 | Sieling et al. ................. 52/518 |
| 5,939,169 A | | 8/1999 | Bondoc et al. ............. 428/141 |
| 6,038,827 A | * | 3/2000 | Sieling ........................ 52/557 |

\* cited by examiner

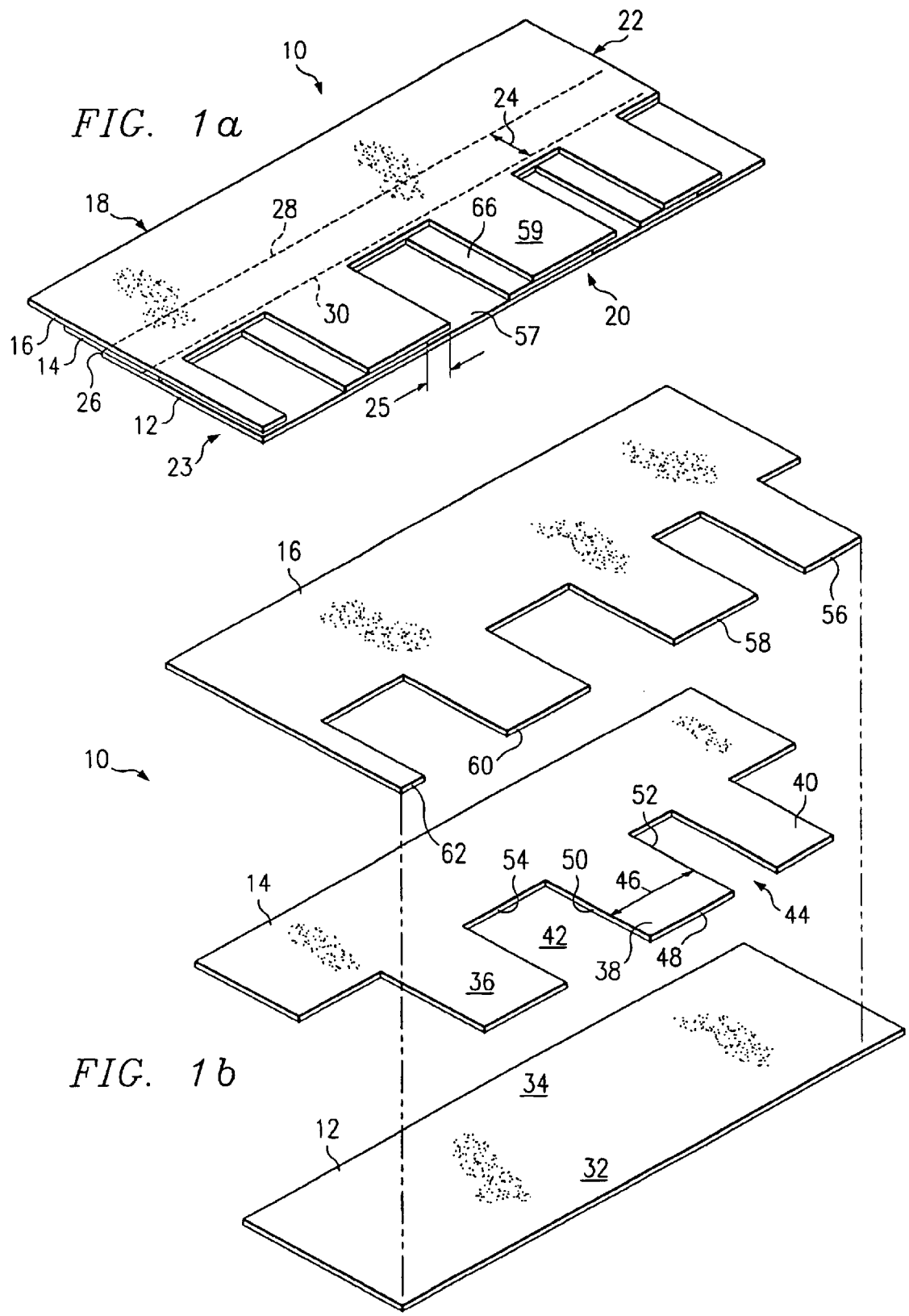

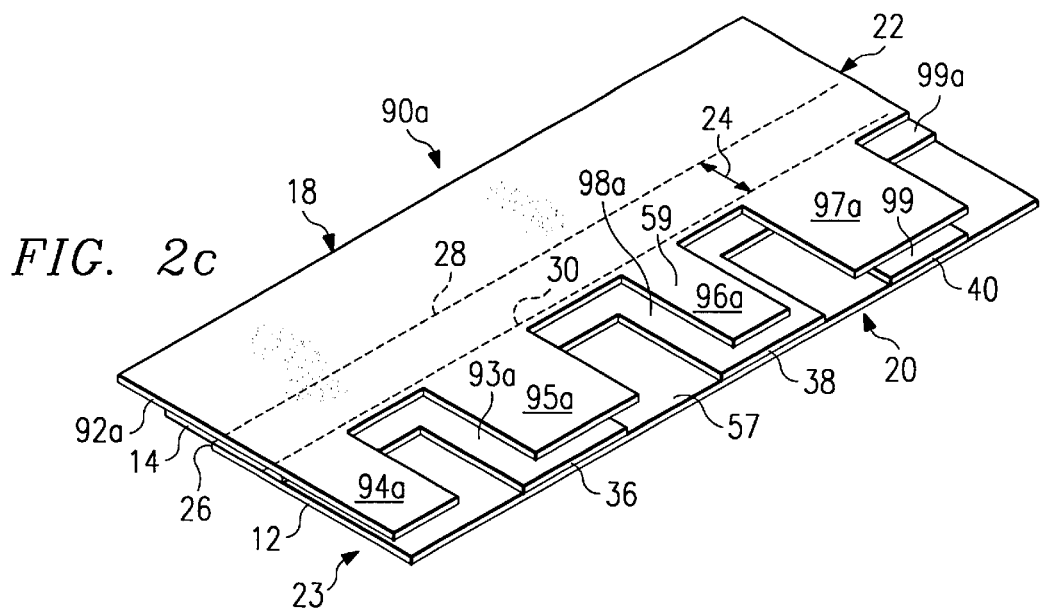
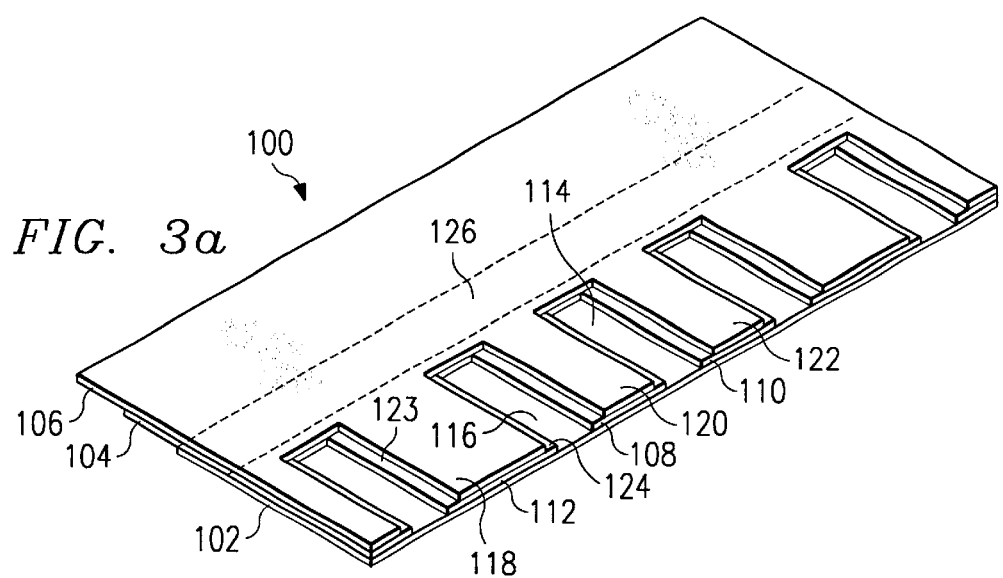

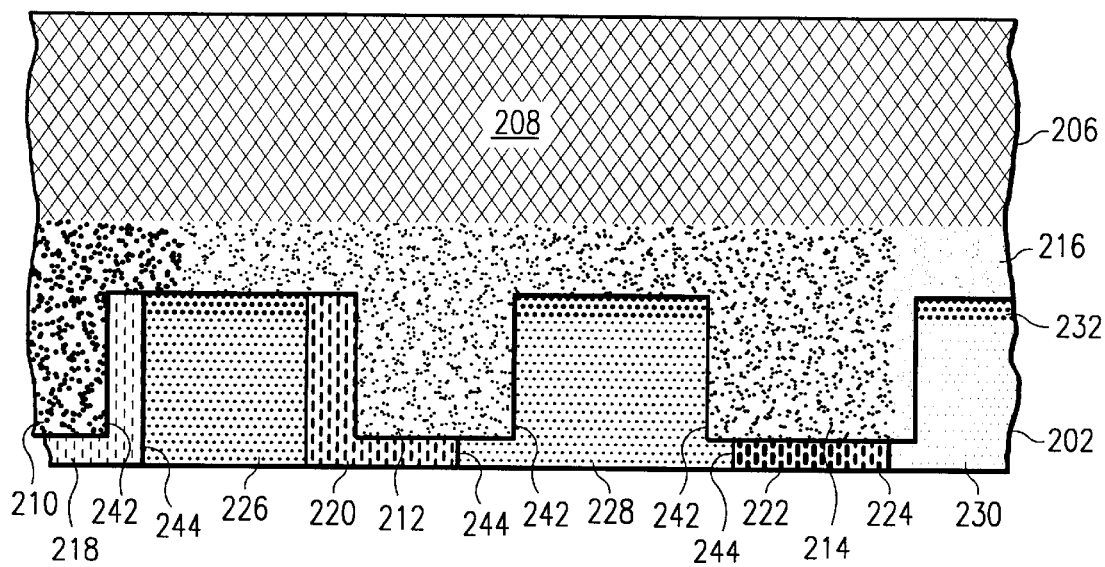
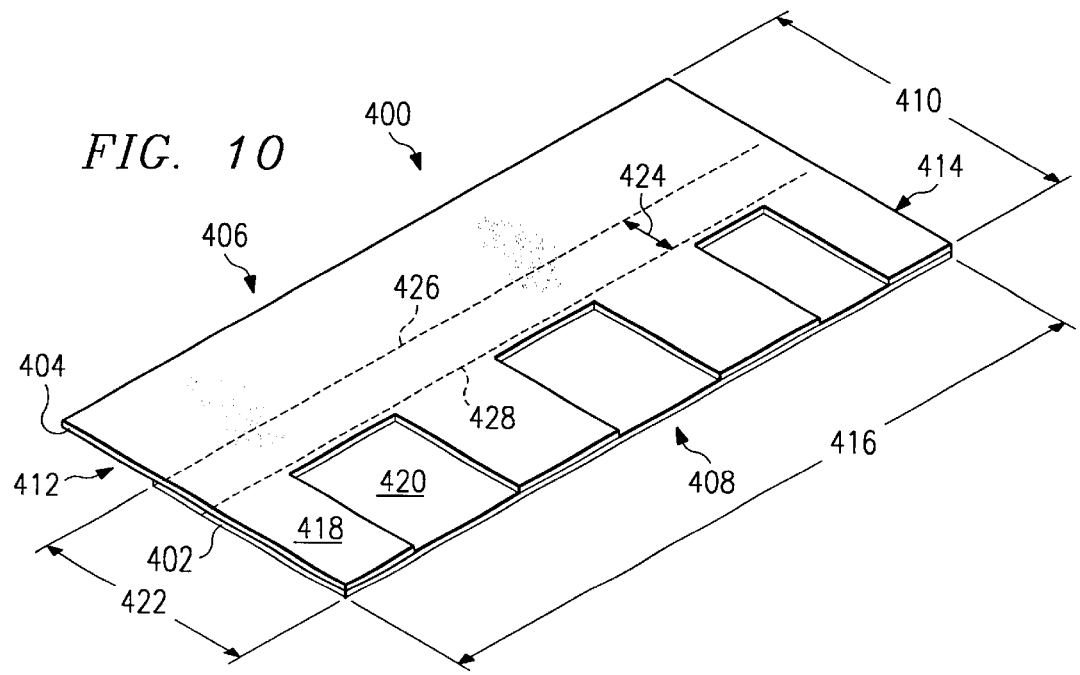

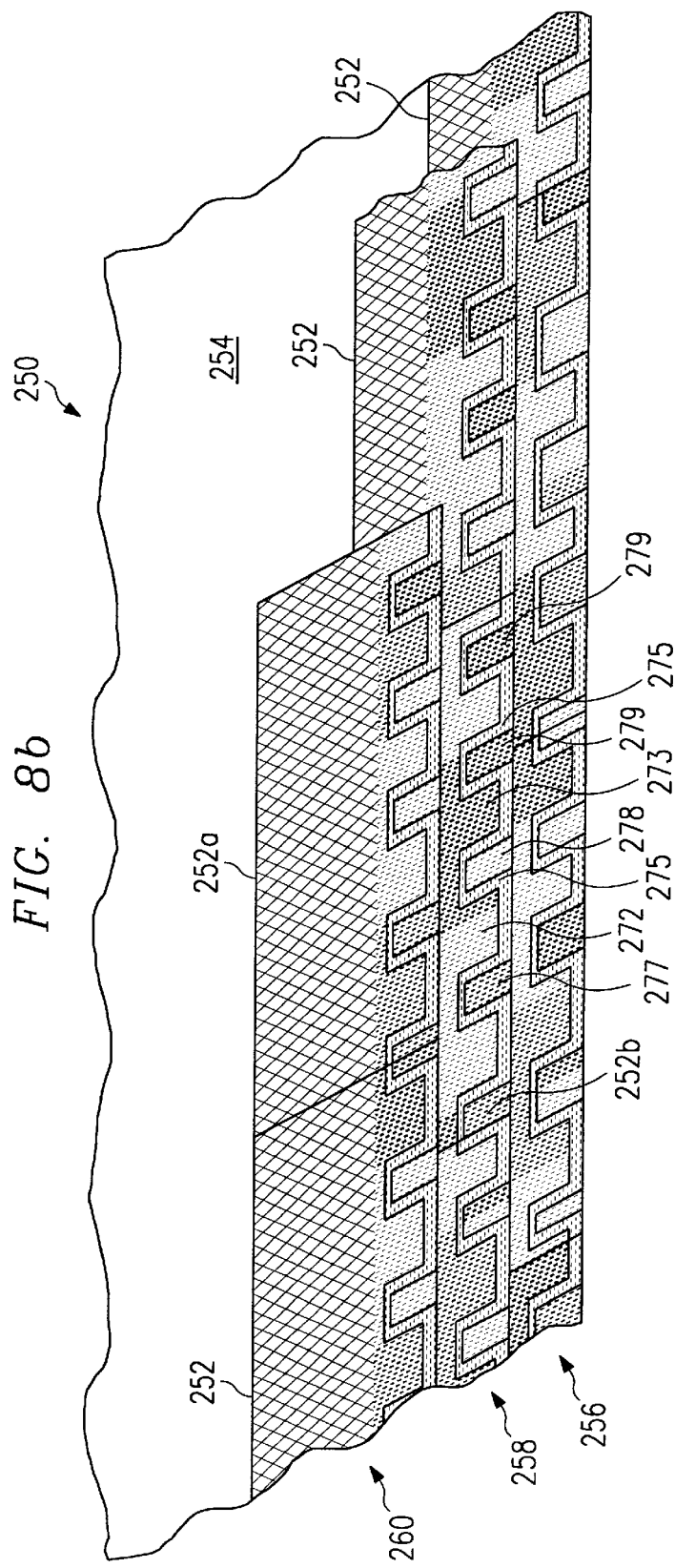

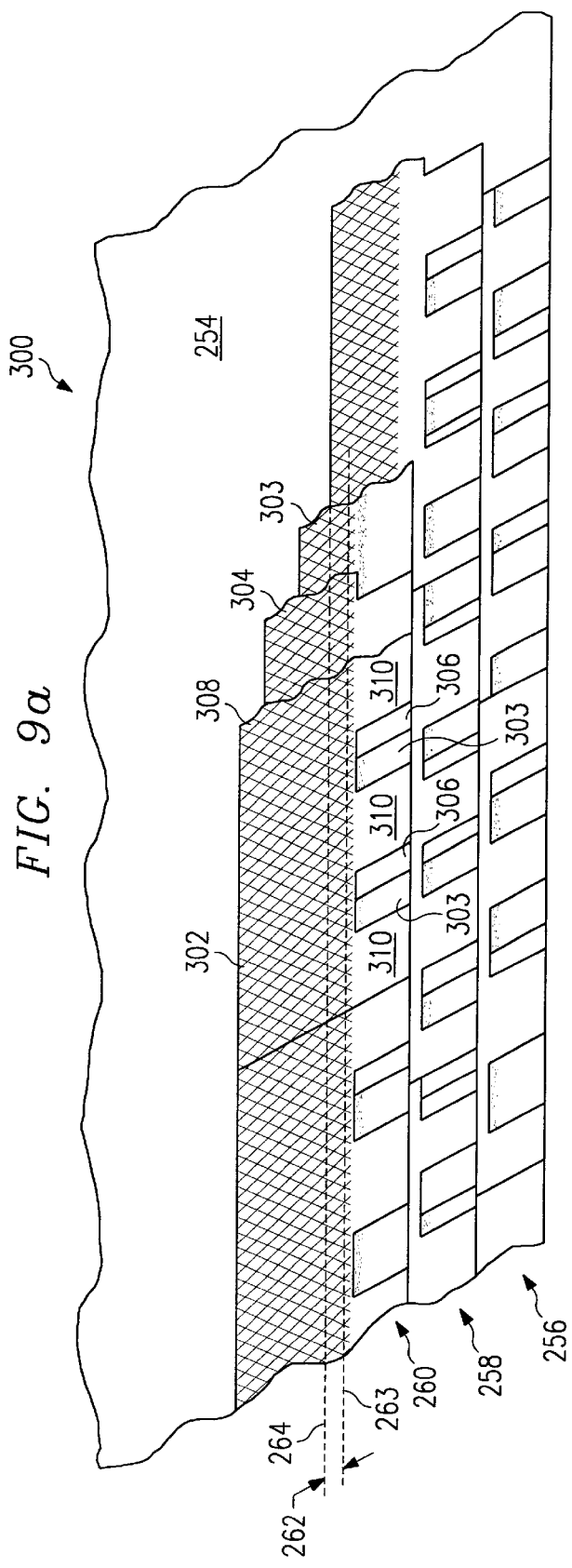

TRIPLE LAMINATE ROOFING SHINGLE

TECHNICAL FIELD OF THE INVENTION

The present invention relates in general to roof coverings, and more particularly to composition roofing shingles of the type that are generally constructed of an asphalt material.

BACKGROUND OF THE INVENTION

A primary function of a roof covering is to prevent rain, snow, sleet, etc. from entering into the dwelling or structure. Many types of roof coverings have been developed, including tile, stone, cement, metal, wood shingles, composition asphalt shingles, all of which shelter the dwelling from the weather elements. In the construction of residential homes, the standard wood shingle and the "shake" shingle have become very popular, due primarily to the aesthetic appearance. The wood shingle, and especially the shake type of shingle is thicker than a conventional composition asphalt shingle, thereby providing a highly contoured surface which presents an aesthetically pleasing "rough" or rustic appearance characterized by juxtaposed light and dark areas or shadows. However, such a wood product type of shingle is expensive, has a limited life, and is prone to severe damage or destruction due to hail, fire, and the like. Despite these disadvantages, the wood shingles remain a very popular roof covering for residential homes.

A majority of residential homes are constructed with a composition-asphalt type of shingle because of the lower cost and long life thereof. In addition, the asphalt type of shingle is more easily installed than the wood shingle, and can be selected from a large variety of colors so that the roof of one residential home does not look the same as the neighboring structure. Improvements continue to be made in the asphalt shingle industry to simulate the appearance or texture characteristics of wood shingles. To that end, the ceramic or mineral granules are often chosen to simulate the color of either a new or weathered cedar wood shingle. Further, asphalt shingles have been constructed in an attempt to simulate the shadow effect of wood shingles by utilizing a darker color ceramic granule at specific areas on the shingle. See, for example, U.S. Pat. No. 5,369,929 by Weaver et al. which is a two-ply shingle with three horizontal color striations to provide a color gradient. The lighter color striation is at the leading edge of the shingle, whereas the darker color striation is at the upper portion of the weather surface part of the shingle. Each striation can also be of a different color to provide different visual effects.

While single layer asphalt shingles could themselves be constructed with a greater thickness to simulate the rustic or rough wood surface with shadowed areas, the weight of the shingle may then be in excess of that required by industry standards, the shingle would be more difficult to install, and would be more costly. As an alternative, asphalt shingles have been developed as a two-ply laminate structure. U.S. Pat. Nos. 5,369,929 and 5,195,290 both disclose a two-ply asphalt type of shingle. One purpose of the two-ply asphalt shingle, together with color variations and shading, is to more closely simulate the wood-type shingle. In U.S. Pat. No. 5,195,290, each ply of the two-ply asphalt shingle appears to be the same width, which is the shorter dimension of the shingle. As such, each shingle requires substantial material and is correspondingly heavy. The shingle disclosed in U.S. Pat. No. 5,369,929 is constructed with a full size upper ply and a lower ply that is approximately half the width of the upper ply. The partial-width lower ply reduces the weight of the shingle. A lower ply width of approximately half the upper ply width or less facilitates packaging of the shingles in a stack with the overhanging portion of the full width upper plies interleaved to form a bundle that does not crown (i.e., rise up) in the center. However, such multiple-ply asphalt singles with partial-width lower plies have a feature, termed the nail zone, which is that portion of the upper-most ply which directly overlies some portion of all the lower plies but which is not exposed to the weather when a subsequent row or course of shingles is installed on the roof. Nails must be installed in the nail zone in order to anchor all plies of the shingle to the roof without being susceptible to leakage (i.e., because they are covered by the subsequent course of shingles).

On conventional multiple-ply shingles with partial-width lower plies approximately half the upper ply width, the nail zone is a horizontal stip approximately 1-inch wide centered approximately 5½ inches to 6 inches from the butt edge of the shingle. The useable width of the nail zone is smaller, however, typically ½ inch to ⅞ inch, to avoid showing the head of the roofing nail after the next course is installed. The location and size of the nail zone is not a matter of choice, but rather is dictated by the structure of the shingle and the amount of each shingle (typically 5 inches or 5½ inches) left exposed to the weather after subsequent courses of shingles are installed according to industry or local practice. Thus, in shingles having a lower ply width approximately half the upper ply width, such as disclosed in U.S. Pat. No. 5,369,929, the nail zone is inherently small. With a small nail zone, there is an increased likelihood that some shingles will be incorrectly installed during nailing to the roof structure. This can lead to leaking, decreased wind resistance, or other problems.

In U.S. Pat. No. 5,195,290, by Hulett, a three-ply shingle is shown constructed substantially identical to the two-ply shingle also disclosed therein. In other words, each of the three plies of the shingle is constructed with the same width, and adhered to each other to form a composite three-ply shingle. As such, the individual shingles are heavy and if packed in a standard sized bundle, such bundle is expected to exceed the standard and accepted weight of a bundle of asphalt shingles. U.S. Pat. No. 4,869,942 by Jennus et al. discloses a trilaminated roofing shingle to provide a physically thick shingle structure at the butt edge, but with only a top layer and bottom layer thereof providing weather-exposed surfaces. In that the second layer of the disclosed trilaminated roofing shingle has no weather-exposed surface, there are a reduced number of granule color variations that can be embedded into such surfaces.

Conventional asphalt shingles, whether of the single or double ply, often suffer the disadvantage of visual defects when installed on a roof. For example, certain roofs will appear to have a "zippered" effect, due to the regularly repeating type or color of the shingle as well as the manner in which the shingles are installed. Other multiple-color shingles will produce a "blotchy" color effect when installed, due primarily to the lack of different color patterns by which the shingles are constructed. Both of these effects are natural artifacts of the design and manufacturing techniques of the shingles, and are due to the lack of a randomness of the few visual features available. In other words, if a shingle design has only a few features, such a tab size or tab color, then it is difficult to obtain a uniform degree of randomness between shingles when installed on a roof. It is also appreciated that it is not an easy task to develop machines and shingle production facilities that provide each shingle with randomized features. In contrast, machines are more easily designed that produce shingles, each with identical features.

The wood-type shingles inherently have randomized features, especially as to color and texture, as trees grow in a nonuniform manner. The wood grain is different from the core to the outside of the tree, and the wood color of each tree is somewhat different. The randomness of features of wood shingles is enhanced by cutting the shingles of a bundle to many different sizes. While this facilitates a uniform randomness in the shingles, it substantially increases the time to install such type of shingle.

In view of the foregoing, there exists a need for a new type of three-ply asphalt shingle that does not exceed a standard and accepted weight, and that provides multiple weather-exposed surfaces on which different color combinations of granules can be deposited. Another need exists for a multiple layer asphalt shingle having an increased nail zone width, thereby resulting in fewer installation errors. Another need exists for a shingle having three layers, each with a weather-exposed surface, and each provided with different shades and/or color combinations of mineral granules. Another need exists for a multiple layer asphalt shingle having many different size and color features to thereby enhance a randomization of the features and provide an aesthetically pleasing roof.

SUMMARY OF THE INVENTION

In accordance with the principles and concepts of the invention, there is disclosed a three-ply shingle that overcomes the problems and shortcomings of the prior art composition shingles. In accordance with a preferred embodiment of the invention, each ply is constructed so that when laminated together, there are weather-exposed surfaces associated with each ply, and each ply is of a different width. The term "width" as used herein generally defines the shorter dimension of the shingle, and the term "length" generally defines the longer dimension of the shingle. The bottom, intermediate and top layers (also referred to herein as posterior, middle and anterior layers, respectively), also known as plies, of the asphalt shingle are preferably constructed with sequentially longer widths so as to form a stepped lower surface when assembled into a shingle. The bottom layer is of a sufficient width so that a wider nail zone exists. As each layer is being individually processed, different shingle 10 is fabricated with a first or bottom (i.e., posterior) layer or ply 12, a second, middle or intermediate layer 14 and a third or top (i.e., anterior) layer 16. The shingle 10 is characterized by a head edge 18 (oriented toward the top of the roof during installation) and an opposing butt edge 20, the distance between such edges 18 and 20 defining a width of the shingle 10. The distance between the shorter opposing edges of the shingle 10, shown as reference numerals 22 and 23, define a length of the shingle 10. The shingle 10 is preferably constructed to one of various width and length standards, such as about 12 inches×36 inches, known as a "standard" shingle or approximately 13¼ inches×39⅜ inches, known as a "metric" shingle. Each ply is preferably, although not necessarily, of the same thickness, such as about 3/16 inch. As can be appreciated, with each of the three layers being about 3/16 inch in thickness, the total thickness of the asphalt shingle 10 is about 9/16 inches. Of course, the shingle 10 can be constructed with different lengths and/or widths to accommodate the building standards that are followed in the different regions, territories or countries. The basic preferred construction of each layer is essentially the same, including a reinforcing mat or web, with an asphalt coating on both sides thereof, and with a layer of mineral granules embedded in at least a portion on the upper surface. For purposes of illustration, in FIGS. 1a–5 the mineral granules are shown covering only portions of the layers. The reinforcing mat is typically constructed of fiber glass, but may also be constructed of asphalt saturated organic felt, polyester, or other fibers or films as are known in the art. Those skilled in the art can readily appreciate that shingle 10 can be constructed with a standard roll-type fiber glass material which progresses through various stations to be coated with a hot asphalt liquid, cooled, impregnated with granules and cut into separate layers having various patterns, and then the layers are over-lapped with each other and bonded or laminated together to form a shades or colors of mineral granules can be dropped thereon so that when laminated together as a composite shingle, many different combinations of shades and/or colors are possible. Moreover, by randomly dropping the different shades and/or colors of the mineral granules on the different layers, a high degree of randomness is obtained to thereby provide an enhanced visual effect.

In a first embodiment of the invention, the bottom asphalt layer is constructed with a desired shade and/or color of mineral granules thereon, but without any tabs or cutouts. A middle or intermediate asphalt layer is also appropriately covered with a desired shade and/or color of mineral granules, but has cutouts and tabs of different lengths (or equivalently, breadths). A top layer of the asphalt shingle is fabricated and also appropriately covered with mineral granules, and also has tabs and cutouts. The tabs of the top layer have a shorter length than the corresponding tab of the intermediate layer situated thereunder. As such, each layer presents a weather-exposed surface with different shades and/or colors of mineral granules. While the butt end edges of all three plies are registered, the opposing side edges of the tabs of the intermediate layer are laterally offset with respect to the tab edges of the top layer. Many variations of this embodiment are possible in which the amount and direction of lateral offset between the tabs of the intermediate and top layers can be constant or can vary randomly.

In another embodiment of the invention, the tabs of the top and middle layers are similar to those of the first embodiment, but the top layer tabs are shorter, as measured in a widthwise manner. With this construction, an enlarged surface area of the corresponding middle layer tab situated thereunder is exposed and is thus visible.

In yet another embodiment of the invention, each tab of the top layer is narrower, as measured in a lengthwise manner, than the corresponding underlying tab of the intermediate layer. The butt end edge of each layer is vertically registered with the other layers. The top layer and intermediate layer are laminated together so that each tab of the top layer is centered on the corresponding larger tab of the intermediate layer. Again, each layer presents a weather-exposed surface on which different combinations of shades and/or colors of mineral granules can be embedded.

In still another embodiment, the shingle layers are similar to those of the previous embodiment, but the tabs of the top shingle layer are somewhat shorter, as measured in a widthwise manner, than the corresponding tabs of the middle layer. A larger weather-exposed area of the middle layer tabs is thus provided.

In a further embodiment, a three-ply shingle includes plural middle layer tabs, each associated with a corresponding smaller-size top layer tab. A portion of the surface of the weather-exposed area of the middle layer is exposed along the entire circuitous edge of the tabs and cutouts of the top layer. With this construction, even a greater surface area of the middle layer is exposed and, when embedded with one or more granule colors, produces an enhanced visual effect.

In yet another embodiment, the tabs of the top and middle shingles are formed with decorative end profiles. This allows weather-exposed areas of all layers of the shingle to have distinctive shapes.

The various layers of the three-layer asphalt shingles are processed to embed one or more mineral granule colors. One or more layers can include multiple bands of granule colors, which bands can be formed in a random manner, as to each successive shingle fabricated. Thus, as the shingles are removed from a bundle and installed in a sequential manner, it is more likely that the random color features are maintained throughout the overall roof. Moreover, the color bands of one layer may run in a different direction, as compared to the direction of the color bands on other layers. Because of the wide variety of different color features, in conjunction with the different size and shape features of the tabs, a shingle having a highly randomized visual effect is achieved.

In another aspect of the invention, a roof for a building is provided comprising a plurality of three-layer asphalt shingles, each of which shingle having weather-exposed areas embedded with mineral granules having colors selected from a variety of groups of colors and arranged in visually distinguishable color zones.

In yet another aspect of the invention, a two-layer asphalt shingle is provided having an extended nail zone.

BRIEF DESCRIPTION OF THE DRAWINGS

Further features and advantages will become apparent from the following and more particular description of the preferred and other embodiments of the invention, as illustrated in the accompanying drawings, in which like reference characters generally refer to the same parts or elements throughout the views, and in which:

FIG. 1a illustrates a three-ply asphalt shingle constructed in accordance with a first embodiment of the invention;

FIG. 1b illustrates the asphalt shingle shown in FIG. 1a, but with the layers thereof separated from each other;

FIG. 2c is another embodiment of the invention, similar to FIG. 2a, but with the tabs of the top layer offset in a widthwise manner with respect to the tabs of the middle layer;

FIG. 3a illustrates a three-layer asphalt shingle constructed in accordance with yet another embodiment of the invention;

FIG. 7e illustrates an alternative embodiment of the composite three-layer shingle of FIG. 7a, having shorter widthwise tabs on the top layer;

FIG. 8b is a roof for a building, similar to FIG. 8a, showing the lengthwise sequence of color zones on the weather-exposed area of each layer;

FIG. 9a is a roof, similar to FIG. 8a, but with a different configuration of tabs on the middle and top layers of the shingles;

FIG. 10 illustrates a two-layer asphalt shingle constructed in accordance with another aspect of the invention having an extended nail zone.

DETAILED DESCRIPTION OF THE INVENTION

Figure 1C:
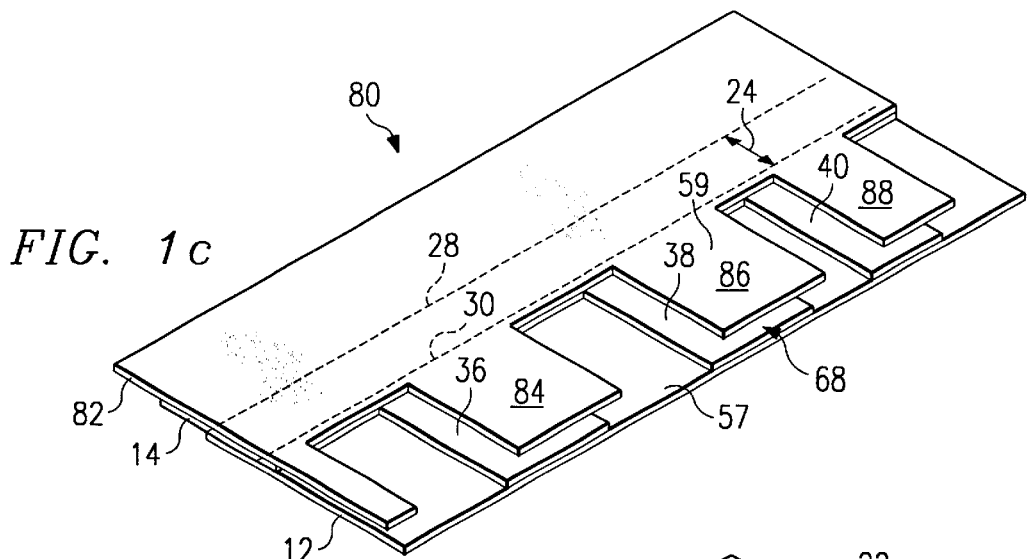
FIG. 1c is another embodiment of the invention illustrating the three different layers of the asphalt shingle generally shown in FIG. 1b, but with the tabs of the top layer being shorter than those of the middle layer.

In this disclosure, certain terminology will be used for convenience in reference only and will not be limiting. For example, the terms "layer" and "ply" are used interchangeably when referring to shingle construction. Directional terms such as "up", "upper", "upward", "down", "lower", and "downward" will refer to directions as taken in the drawings in connection with which the terminology is used.

FIG. 1a illustrates the three-ply asphalt shingle constructed in accordance with a first embodiment of the invention. The asphalt composite structure. While not specifically shown, those skilled in the art can readily appreciate that the shingle 10 can include areas of adhesive on the top or on the bottom side thereof, to facilitate adhering between the different shingle courses when installed.

As noted above, the width of the entire shingle 10 is about 12 to about 13 inches. However, the width of the middle layer 14 is within the range from about 80% to about 85% of the width of the entire shingle 10, while the width of the bottom layer 12 is even shorter, being within the range from about 51% to about 63% of the width of the entire shingle 10. In a preferred embodiment, the width of the middle layer 14 is about 83% of the width of the entire shingle 10 and the width of the bottom layer 12 is within the range from about 52% to about 60% of the width of the entire shingle. Note that the width of the bottom layer 12 is greater than one-half the width of the entire shingle 10. With this construction, the nail zone of the current invention, as shown in FIG. 1a between the two broken lines 28, 30 and identified by reference numeral 24, has a width within the range of about 15% to about 18% of the width of the entire shingle 10 compared with a width of about 8% of the width of the entire shingle for the nail zone of previously known multiple-ply shingles with partial-width lower plies. In a preferred embodiment, the nail zone 24 has a width within the range of about 16% to about 17% of the width of the entire shingle. In another embodiment, the nail zone has a width greater than about one inch. The nail zone 24 is situated in the region bounded by a head edge 26 of the bottom layer 12, which corresponds to the broken line 28. The opposing edge of the nail zone 24 corresponding to line 30 is the edge of the weather-exposed area of the shingle, that is, the line to which subsequent courses of shingles will be installed. The weather-exposed line 30 is positioned at least about 5 inches from the butt edge 20 and typically about one-half inch back from lateral edge of the cutouts forming the tabs of the entire shingle 10. While the standard nail zone of many types of shingles is less than about one inch in width, it can be appreciated that with the wider nail zone 24, there will be fewer mistakes in mis-nailing or failing to catch all of the layers during installation of the entire shingle 10. A better quality and longer lasting roofing cover is thereby provided.

Referring still to FIG. 1a, the side edges 22, 23 of each layer are registered, as are the butt edges 20 thereof. The head edges of each layer form a stepped configuration on the bottom surface of the shingle to reduce the amount of asphalt material and thus the weight of the shingle, as well as to allow the overlapped courses of shingles to form a less discontinuous surface when installed.

FIG. 1b illustrates the structural features of the three individual layers of the asphalt shingle 10. The bottom layer 12 is substantially rectangular in shape, having a frontal surface 32 defining a generally weather-exposed surface, and a rear surface 34 that is generally not exposed to the weather elements. Both surface areas 32 and 34 are covered with mineral granules to provide an extended life structure. The weather-exposed area 32 is preferably covered with mineral granules of a desired shade and/or color, whereas the color of the mineral granules covering the non-weather-exposed surface area 34 is irrelevant to the appearance of the entire shingle. The non-weather-exposed area 34 can therefore be covered with granules of any color including a mixed waste collection of colored mineral granules that are either left over from previous operations or are in excess of that needed during the different granule dropping operations. As will be described in more detail below, the weather-exposed surface 32 can be fabricated with different size areas and with random colors and/or shades of mineral granules embedded therein.

As previously described, the middle layer 14 of the asphalt shingle 10 has a width that is longer than the width of the bottom layer 12. In addition, the middle layer 14 includes plural tabs 36, 38 and 40. Each tab, such as tab 38, is defined by a first cutout 42 and a second cutout 44, which cutouts may be common to other adjacent tabs. In accordance with an important feature of the invention, the tab (i.e., breadth) shown by arrow 46, of each tab in a particular layer on a particular shingle is different. The different length tabs provide a visual randomness to thereby accentuate the visual effect of a shingled roof Each tab, such as tab 38, includes a butt edge 48 and opposing tab side edges 50 and 52. The cutouts, such as cutout 42, are bounded by the side edges of adjacent tabs. A cutout lateral edge 54 is situated near the lower nail zone boundary line 30. As noted above, the tabs in each layer of each shingle 10 may vary in number, as well as vary individually in length 46 per shingle. In addition, each shingle 10 is sequentially fabricated so that at least each pair of shingles in a series is different, in that the length 46 of each tab in a particular layer has a different dimension, and thus each shingle is generally not physically identical to each other.

The placements of tabs and cutouts on the top and middle of the shingle of the current invention provides a variety of different appearances. For example, in the embodiment shown in FIG. 1a, even though the tab sizes of the middle layer 14 are random, there is a dimensional conformity between the tabs of the middle layer 14 and the tabs of top layer 16 of each shingle 10. The top layer 16 has a length and width that defines the length and width of the overall asphalt shingle 10. The top layer 16 includes plural tabs, four shown in the embodiment of FIG. 1b. Tab 56 has generally the same length and width (i.e., breadth and height respectively) as the corresponding tab 40 of the middle layer 14. Height refers to the width of the tab extending from the bottom of the continuous portion of the layer. In like manner, tabs 58 and 60 of the top layer 16 correspond to tabs 38 and 36 of the middle layer 14. However, each tab of the top layer 16 is offset laterally a predefined amount with respect to the corresponding tab of the middle layer 14. The offset is shown in FIG. 1a as reference numeral 25. Partial tab 62 of the top layer 16 does not have a corresponding tab in the middle layer 14 due to the offset nature of the tabs between the top and middle layers. While the tabs can be offset in a lengthwise manner a nominal amount, it is anticipated in this embodiment that such offset will be about 0 to about 4 inches. Hence, a rectangular weather-exposed area, such as area 66 in FIG. 1a, of each tab of the middle layer 14 will be exposed. This weather-exposed area will be visible on the finished, installed shingle along with the weather-exposed areas of the bottom layer, such as area 57, and of the top layer, such as area 59.

FIG. 1c illustrates another embodiment related to that shown in FIG. 1a. The asphalt shingle 80 shown in FIG. 1c has a bottom layer 12 and an intermediate layer 14 substantially identical to that described above. The top layer 82 is similar to the top layer 16 shown in FIG. 1a, but with tabs having a shorter width. For example, tab 84 of the top layer 82 is shorter than the corresponding tab 36 of the middle layer 14. Tabs 86 and 88 of the top layer 14 are shorter than the corresponding tabs 38 and 40 of the bottom layer 12. In this manner, additional surface areas, such as area 68 in FIG. 1c, of each of the tabs 36, 38 and 40 of the middle layer 14 are exposed, and thus the color of the visible granules provides a further random pattern, with respect to the tabs of the top and bottom layers 82 and 12. It can be seen that the weather-exposed areas of the middle layer, such as area 68 on tab 36, are generally L-shaped.

Figure 2A:
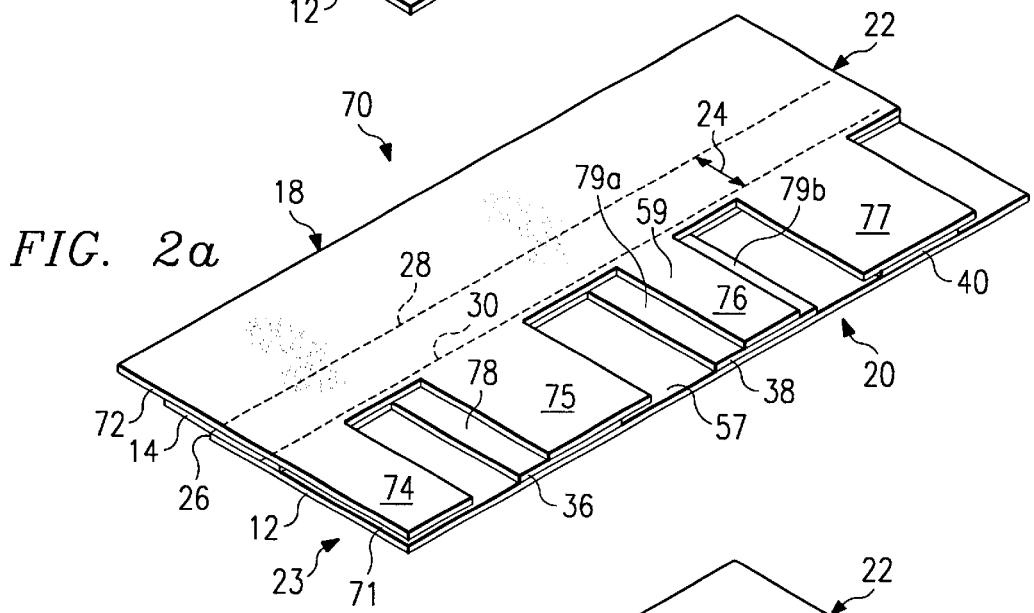
FIG. 2a is yet another embodiment of the invention having the tabs of the top layer randomly positioned with respect to the tabs of the middle layer.

In the previously described embodiments, there is a general correspondence between the dimensions and positions of the tabs of the middle and top layers of each shingle. Further embodiments of the current invention are also possible, however, in which the relationship between the dimensions and positions of the tabs of the middle and top layers of each shingle are random. For example, FIG. 2a illustrates a three-layer asphalt shingle 70 having a bottom layer 12 and a middle layer 14 substantially identical to that described above. The top layer 72 is similar to top layer 16 shown in FIG. 1a, but the tabs 74, 75, 76 and 77 have lengthwise dimensions and positions which are random with respect to the tabs 36, 38 and 40 of the middle layer 14. As a result of this random relationship, a variety of rectangular weather-exposed surfaces of the middle layer 14 are presented on shingle 70, including area 78 on the left portion of tab 36, area 79a on the left portion of tab 38, and area 79b on the right portion of tab 38. In other areas of the shingle, a tab of the top layer 72 may completely cover the tab of the middle layer 14, as is the case with tabs 77 and 40, or a tab of the top layer 72 may overlie the bottom layer 12 directly with no middle layer tab being present, as is the case with tab 74. Note that in the Figures the gap (such as denoted by reference number 71 in FIG. 2a) shown beneath top layer tabs (such as tab 74) having no middle tab therebeneath is vertically exaggerated for purposes of illustration; such tabs will actually bend downward to lie on the upper surface of bottom ply 12.

Figure 2B:
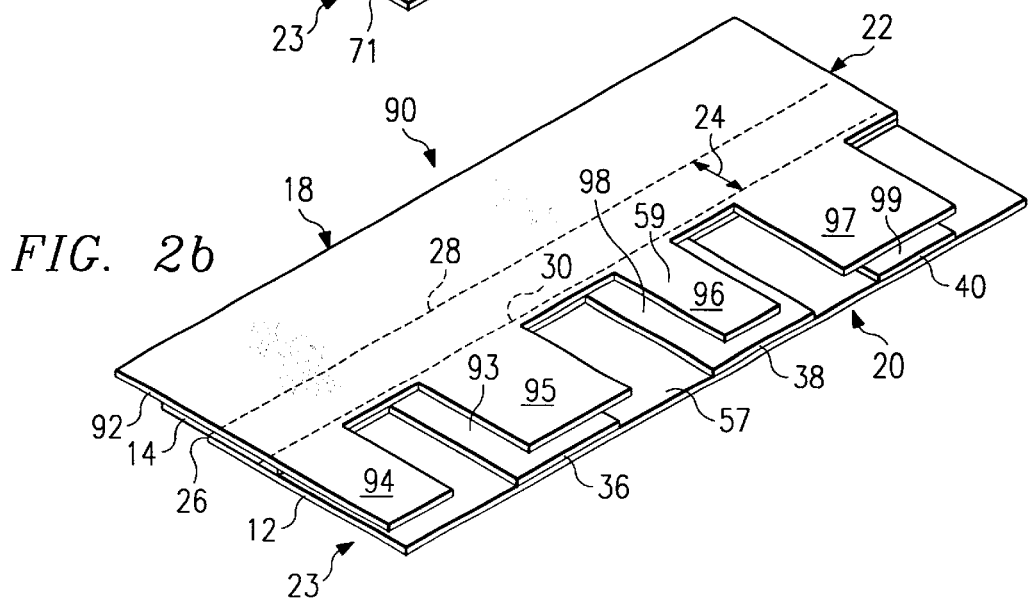
FIG. 2b is still another embodiment of the invention, similar to FIG. 2a, but with the tabs of the top layer being shorter than those of the middle layer.

FIG. 2b illustrates yet another embodiment of three-layer asphalt shingle related to that shown in FIG. 2a. Shingle 90 has a bottom layer 12 and middle layer 14 as previously described. The top layer 92 is similar to the top layer 72 in FIG. 2a, but the tabs 94, 95, 96 and 97 are shorter widthwise, thereby creating a different variety of weather-exposed surfaces of the middle layer 14. As can be seen in FIG. 2b, the space between tab 96 and tab 97 is approximately 0.5 of the breadth of tab 97. The weather-exposed areas include L-shaped area 93 on tab 36, U-shaped area 98 on tab 38, and rectangular area 99 on tab 40.

FIG. 2c illustrates still another embodiment of three-layer asphalt shingle related to that shown in FIG. 2a. Shingle 90a has a bottom layer 12 and middle layer 14 as previously described. The top layer 92a is similar to the top layer 72 in FIG. 2a, but the tabs 94a, 95a, 96a and 97a are offset widthwise with respect to the tabs 36, 38, 40 of the middle layer 14, thereby creating a different variety of weather-exposed surfaces of the middle layer 14. The weather-exposed areas include Z-shaped area 93a, extended U-shaped area 98a, and rectangular areas 99 and 99a.

In the preferred embodiments, the nail zones 24 of the three-ply shingles 70 and 90 shown in FIGS. 2a and 2b, respectively, are substantially wider than that generally available in prior art shingles, for the same reason noted above in conjunction with FIG. 1a.

Still further embodiments of a three-layer asphalt shingle are possible utilizing the construction of the current invention, similar to those embodiments previously described, but having the tabs of the upper layer centered on the tabs of the middle layer. FIG. 3a illustrates a three-layer asphalt shingle 100 constructed according to another embodiment of the invention. The shingle 100 includes a bottom layer 102, a middle layer 104 and a top layer 106. The bottom layer 102 is similar to those of the embodiments described above. The second or middle asphalt layer 104 is constructed with a plurality of tabs with at least some of the tabs being of a different length dimension. For example, tab 108 of the middle layer is of a length smaller than tab 110 which, in turn, is shorter than the tab 112. The remaining tabs may have similar or yet different dimensions, as measured in a lengthwise direction of the shingle. The weather-exposed surface of the bottom layer 102, such as areas 114 and 116, comprise areas that are not covered by the tabs of the middle layer 104. As can be appreciated, the different weather-exposed areas of the bottom layer 102 are of different sizes and areas. As will be described more fully below, this allows different variations of colors of the mineral granules that are embedded in the bottom asphalt layer 102.

The top layer 106 of the three-layer shingle 100 includes plural tabs, such as identified by reference numerals 118, 120, and 122, and others. Importantly, the tabs of the top layer 106 are registered, that is situated so as to partially overlie the corresponding tabs of the middle layer 104 and be centered thereon in a length-wise direction of the shingle. As noted in FIG. 3a, each tab, for example tab 118 of the top layer 106, is centered in a length-wise manner, with regard to tab 112 of the bottom layer 102. In this manner, a pair of weather surfaces 123 and 124 of tab 112 are exposed to the elements. The area of exposure depends on the difference between the length of the top tab 118 and that of the middle tab 112, and can be of a variety depending on the visual effect desired. When the weather surface areas 123 and 124 of the middle tab 112 are small, the shingle is perceived with a greater degree of roughness. It is also noted that while FIG. 3a shows the weather surface area 123 of the middle tab 112 to be about the same as the weather surface 124 of such tab, the equality of the area is not essential or necessary. Moreover, the tabs of the middle layer 102 and the top layer 106 can be constructed so that for each corresponding pair of tabs, different weather exposure areas of the second tabs are provided within the same shingle. As yet another alternative, each different shingle 100 can have different surface areas for the respective tabs to thereby provide an additional degree of randomness in the shingle features.

The nail zone 126 of the three-ply shingle 100 is substantially wider than that generally available in prior art shingles, for the same reason noted above in conjunction with the three-ply shingle 10 described in connection with FIG. 1a.

Figure 3B:
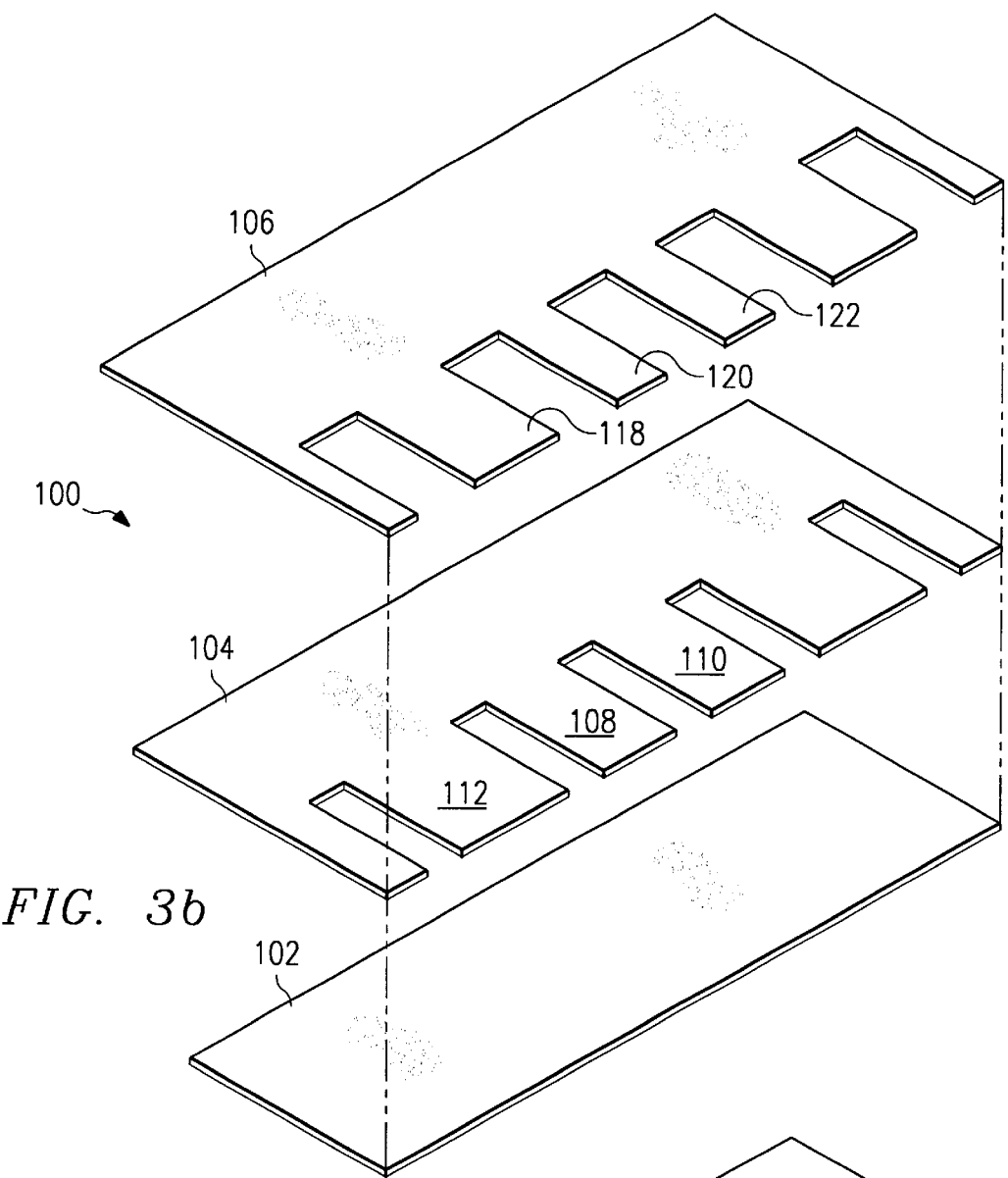
FIG. 3b illustrates the asphalt shingle of FIG. 3a, but with the different layers thereof separated from each other.

FIG. 3b illustrates the individual layers of the shingle 100 shown in FIG. 3a, but with such layers separated from each other in a vertical direction.

Figure 3C:
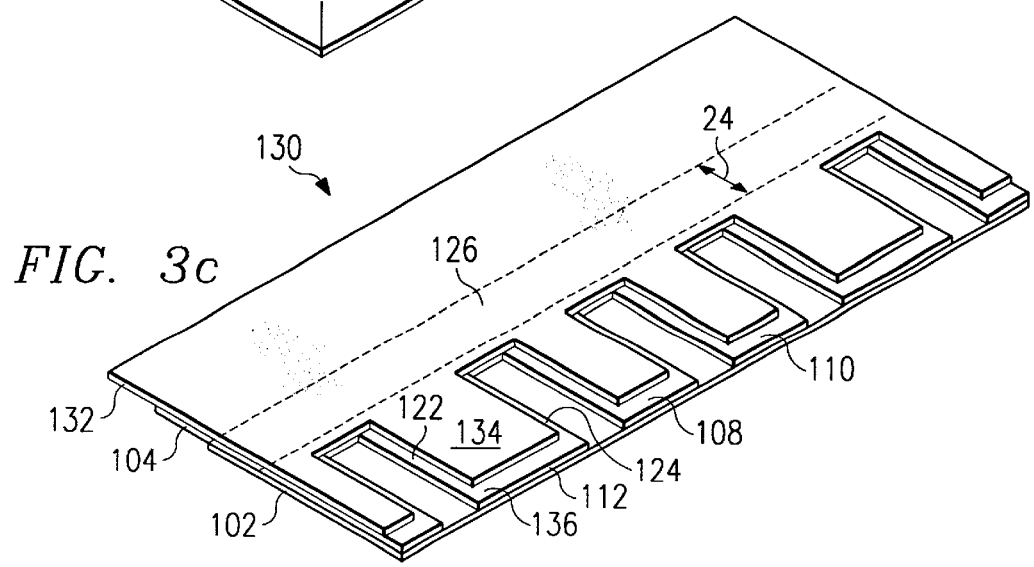
FIG. 3c is still another embodiment of the invention illustrating the three different layers of the shingle generally shown in FIG. 3b, but with tabs of the top layer being shorter than those of the middle layer.

FIG. 3c illustrates a three-ply asphalt shingle 130 that is similar to that described above in connection with FIG. 3a, but constructed with an upper layer 132 having plural tabs with shorter widths. While the butt end edge of the tabs 108–112 of the middle layer 104 are registered with the corresponding butt end edge of the bottom layer 102, this is not the case with the tabs of the top layer 132. For example, the tab 134 of the top layer 132 is recessed width-wise from the butt end edge of the corresponding tab 112 of the middle layer 104, thereby exposing a frontal weather surface area 136 of the middle layer tab 112. The other tabs of the middle layer 104 can be similarly constructed to provide corresponding weather-exposed areas of the respective middle layer tabs. With this construction, and with regard to middle layer tab 112, the combined U-shaped weather surface area is that noted by reference numerals 122, 124 and 136. In this embodiment, the tabs have a complimentary configuration in which the tabs of the intermediate sheet are of the same but enlarged general shape of the tabs in the anterior layer. Again, this provides a different visual effect when a number of the three-ply shingles 130 are installed in courses.

Figure 3D:
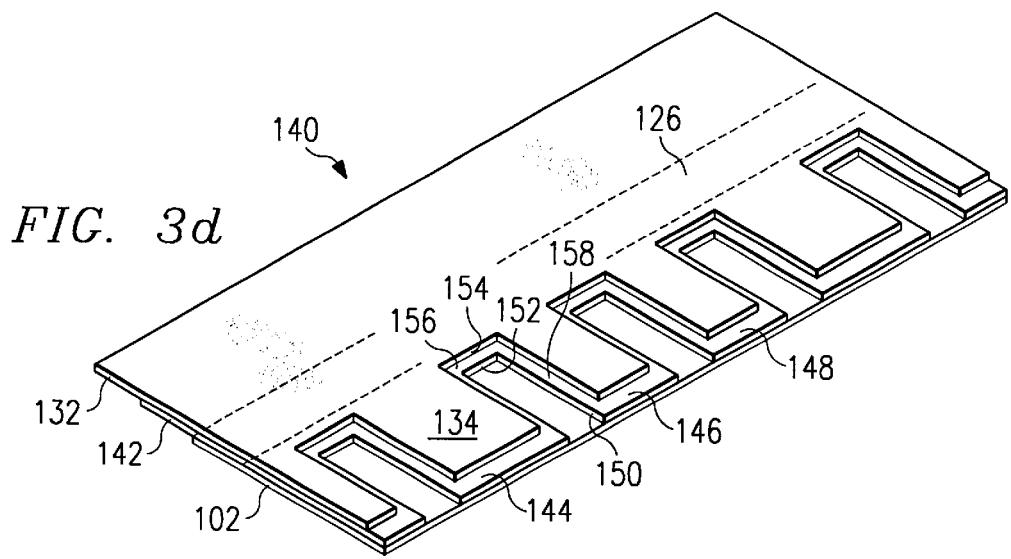
FIG. 3d illustrates a three-ply shingle constructed in accordance with a further embodiment of the invention, with top and bottom layers similar to those shown in FIG. 3c, but with a shorter width-wise cutout formed between the tabs of the middle layer.

FIG. 3d illustrates a three-ply asphalt shingle 140 constructed in accordance with another embodiment of the invention. The bottom layer 102 and the top layer 132 of the shingle 140 are substantially identical to that shown and described above in connection with FIG. 3c. The tabs 144–148 of the second layer 142 each have a width that is substantially the same as that shown in FIG. 3c. However, the cutout 150 between the middle layer tabs 144 and 146 has a lateral edge 152 that is not in vertical registry with the lateral edge 154 formed in the top layer 132. In this embodiment, the weather-exposed area of the middle layer 142 is serpentine in shape. Preferably, although not by way of necessity, the exposed weather surface 156 is of the same width as that of the length of the weather-exposed surface 158. By constructing a three-ply asphalt shingle in this manner, yet other visual effects can be achieved to enhance the randomness between the shingles of the same course, as well as different courses when installed on a roof.

Figure 4:
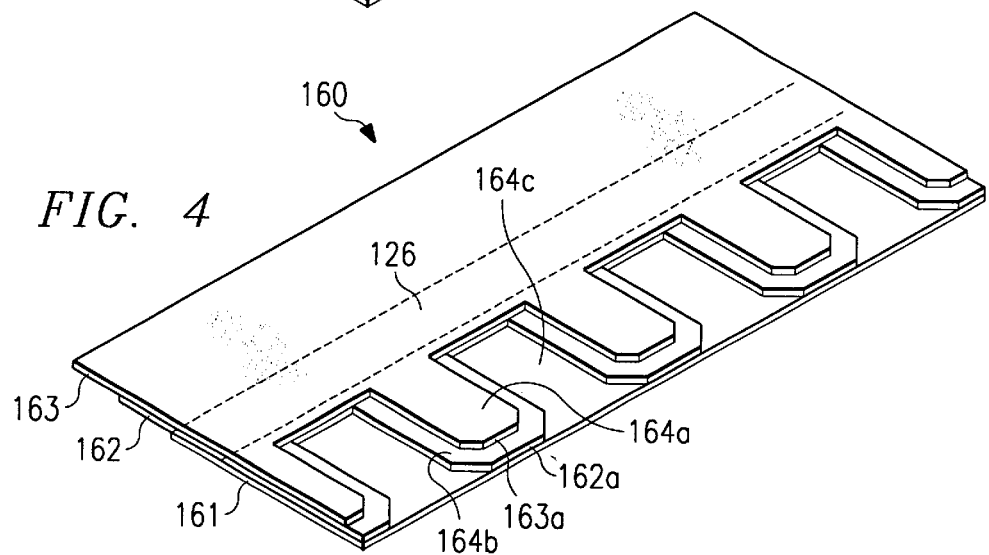
FIG. 4 illustrates a three-ply shingle constructed in accordance with another embodiment of the invention, with the tabs on the top and middle layers having a dog-ear profile.

Yet further embodiments of the current invention can be constructed by forming a complimentary configuration in which the tabs and cut-outs of the top and middle layers in decorative profiles rather than in rectangles. Referring to FIG. 4, a three-ply asphalt shingle 160 constructed in accordance with another such embodiment of the invention is shown. The bottom layer 161, middle layer 162, and top layer 163 are constructed similar to those embodiments previously described in FIGS. 3a–d. Importantly, however, the tabs (such as 162a) of the middle layer 162 and the tabs (such as 163a) of the top layer 163 are cut with a dog-ear pattern, resulting in uniquely shaped weather-exposed areas such as area 164a on tab 162a, area 164b on tab 163a, and area 164c on bottom ply 161. As can be seen in FIG. 4, the space between the tabs of the middle layer is approximately 0.69 of the breadth of the tabs of the middle layer, and the space between the tabs of the top layer is approximately 1.78 of the breadth of the tabs of the top layer. Each of the weather-exposed areas 164a, 164b, and 164c on the top, middle and bottom layers 163, 162, and 161, respectively, of shingle 160 can be covered with colored mineral granules having either solid colors or mixtures of colors to provide a variety of appearances.

Figure 5:
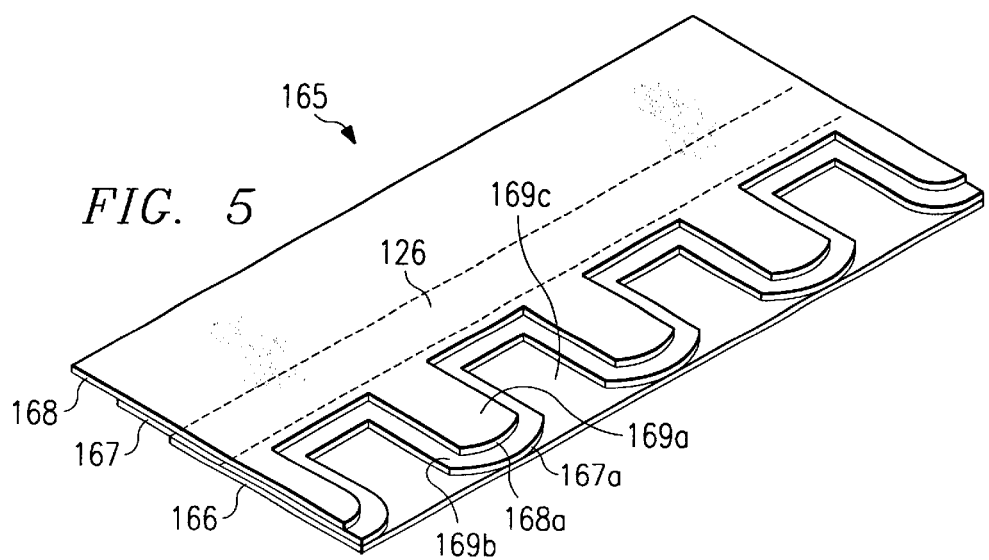
FIG. 5 illustrates a three-ply shingle constructed in accordance with another embodiment of the invention, with the tabs on the top and middle layers having a beaver-tail profile.

Referring to FIG. 5, another embodiment of a three-ply asphalt shingle is shown. Shingle 165 has a bottom layer 166, middle layer 167, and top layer 168 constructed similar to the embodiment described in FIG. 4, however the tabs (such as 167a) of the middle layer 167 and the tabs (such as 168a) of the top layer 168 are cut with a beaver-tail pattern. In addition, in the embodiment shown, the cut-outs between the tabs of the top layer 168 are longer widthwise than the cutouts between the tabs of the middle layer 167, resulting in the weather-exposed area 169b of the middle layer having a continuous serpentine appearance. As in the previous embodiments, each of the weather-exposed areas 169a, 169b, and 169c of each layer can be covered with mineral granules of a single color or of multiple colors to enhance the appearance of the shingle.

Figure 6A:
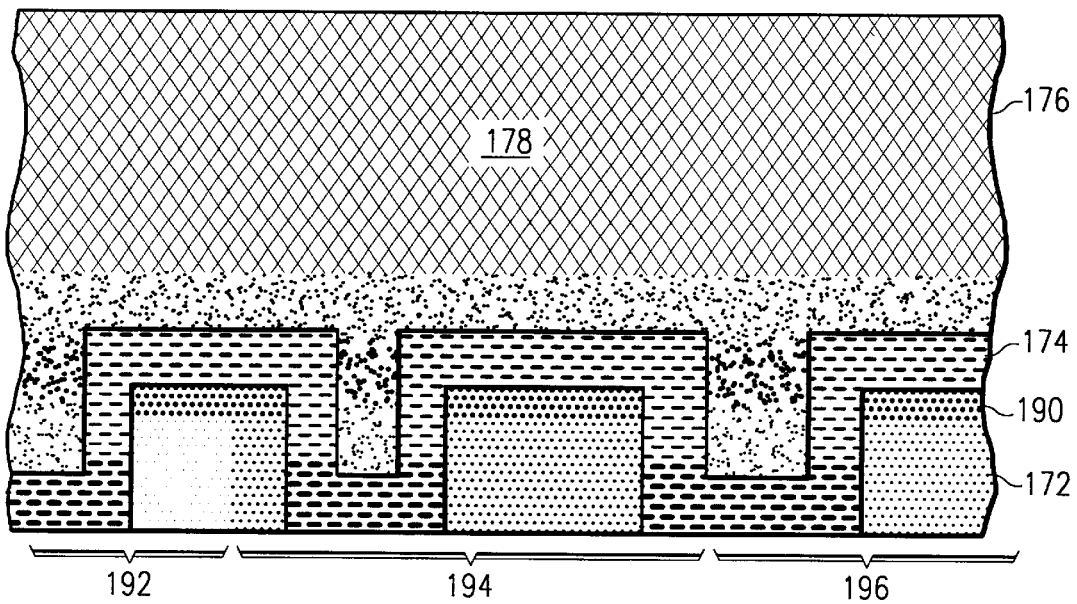
FIG. 6a is a portion of a composite three-layer asphalt shingle showing the different color combinations formed on the weather-exposed areas of each layer.
Figure 6B:
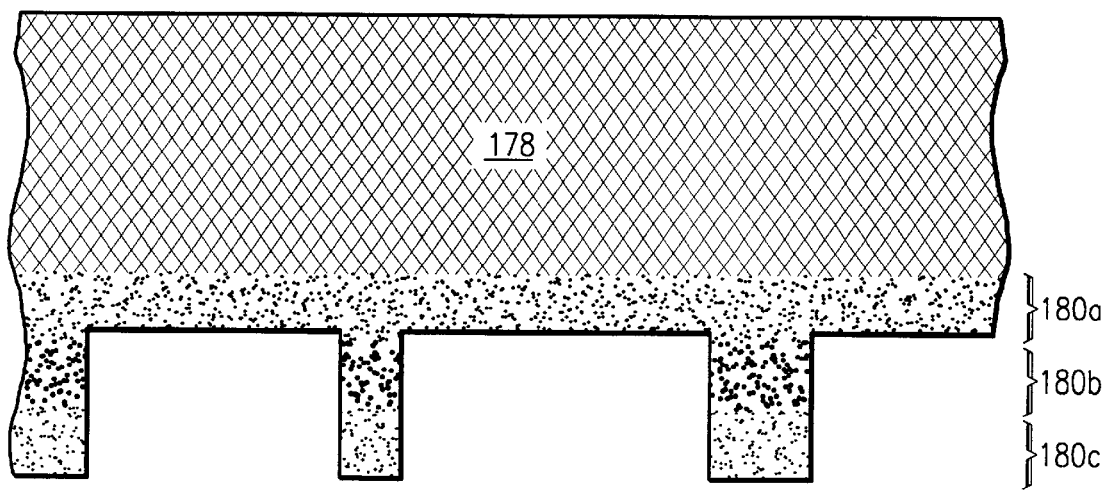
FIGS. 6b–d illustrate the respective top, middle and bottom layers of the composite shingle of FIG. 6a with the different granule color combinations shown with respect to each layer.
Figure 6C:
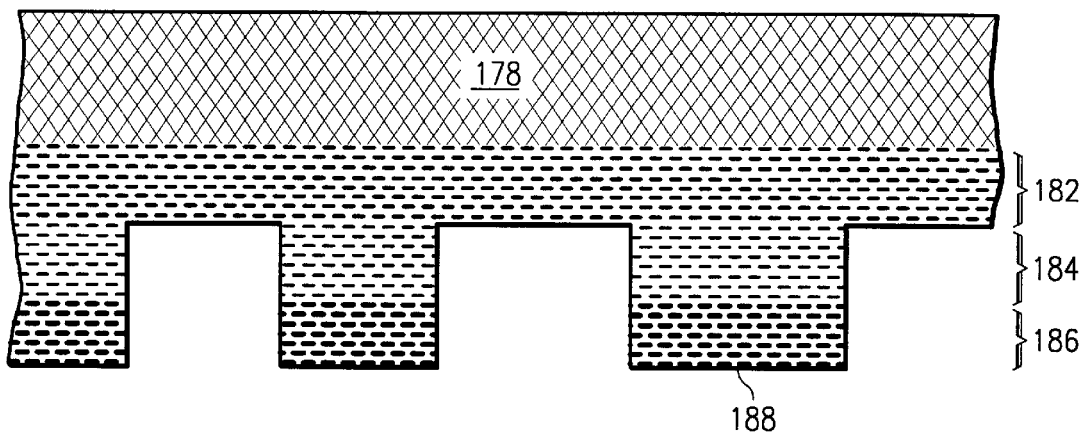
Figure 6D:
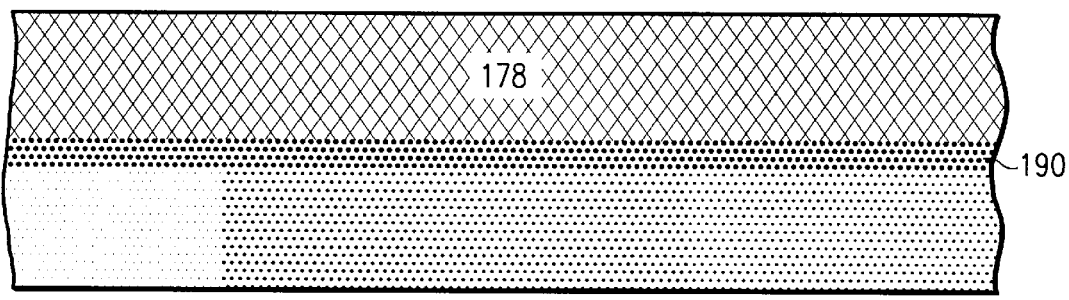

FIG. 6a, in conjunction with FIGS. 6b–d, illustrate a portion of a three-layer shingle showing the various colors and/or shades by which the mineral granules can be impregnated into each layer of the asphalt shingle. FIG. 6a illustrates a three-ply asphalt shingle 170 constructed in accordance with another embodiment of the invention having plies arranged similarly to the shingle of FIG. 3c. The three-ply shingle 170 includes a bottom layer 172 shown in more detail in FIG. 6d, a middle layer 174 shown in more detail in FIG. 6c, and a top layer 176 shown in more detail in FIG. 6b. The double diagonal cross hatch pattern 178 represents non-weather-exposed areas of the layers which are not visible after assembly and installation of the shingle and which typically have mixed waste mineral granules pressed into the asphalt coating. The mixed waste granules used in area 178 generally constitute a random mixture of granules that did not become embedded within the asphalt coating during earlier processing of the layers, and thus can be recovered so as to reduce the fabrication costs of the shingle. Since various colors of the granules are accumulated and mixed together, the mixed waste granules have a random color blend which may vary from time to time or from area to area. However, since surface areas 178 are not visible after manufacture and installation, then the color and/or shade of the granules at these locations is generally irrelevant. As can be seen in FIG. 6a, the mixed waste granules associated with the non-weather-exposed area 178 of the bottom layer 172 (FIG. 6d) and the non-weather-exposed area 178 of the middle layer 174 (FIG. 6c) are hidden from view by the top layer 176 once the shingle is assembled. While the mixed waste granules covering non-weather-exposed area 178 of the top layer 176 are visible on the individual shingles, when a second course of shingles are installed thereover, the mixed waste granules of the top layer 176 are hidden from view. It will be understood that granules of any color could be used in place of the mixed waste granules with no significant difference in appearance after manufacture and installation.

With regard to FIG. 6b, the top layer 176 of the three-layer asphalt shingle 170 includes three color zones 180a, 180b, 180c, in which a desired color or shade of mineral granules are embedded. It should be noted that the symbolic color designations shown in FIGS. 6a–d do not depict any specific colors or shades of mineral granules, but rather only depict areas visually distinguishable from one another because of the colors or shades of granules. However, the different densities of the dots and broken lines shown in such figures do depict different colors or shades of the mineral granules. Moreover, the various color zones, including zones 180a, 180b, 180c, may include mineral granules of multiple colors which are mixed in a specific ratio to define a variegated color zone. For example, a first variegated color zone could consist of a mixture of 50% white granules and 50% black granules. A second variegated color zone could consist of a mixture of 25% dark brown granules, 25% light brown granules, and 50% green granules. Any number of such variegated color zones using a mixture of different solid color granules mixed in specific ratios can be created. To that end, a single color, as the term is used further herein, includes granules of identical color, as well as granules of multiple colors mixed in a specific ratio. If the visually perceived colors of the granules generally change from one surface area of the layer to another, then different color zones are involved. In addition, if the general percentage of the different color granules within a mixture change from one surface area of the layer to another, then again different color zones are involved.

While the color zones 180a, 180b, 180c, of the shingle layer depicted in FIG. 6b are shown changing from one zone to another zone in a widthwise manner, it will be apparent that the color zones may change from one zone to another zone in either a lengthwise manner or a widthwise manner across an individual layer of the shingle. Further, the color zones may change from one zone to another zone in different directions on different layers of the same shingle.

The middle shingle layer 174 shown in FIG. 6c includes a non-exposed weather surface area 178 which can be covered with any color of granules including a mixed waste mineral granule composition. The exposed weather surface of the middle layer 174 is shown to include three color zones. Note, however, that some portions of the color zones of the middle and bottom layers shown in FIGS. 6c, 6d are actually non-weather-exposed areas since they are subsequently covered by the tabs of an overlying layer. For the purpose of illustration, however, the color zones in FIGS. 6c, 6d are shown as they exist prior to assembly of the shingle. The first color zone 182 extends in a band the entire length of the layer. The color zone 182 is not shown to extend into the tabs, but it may, depending upon the visual effect desired. A second color zone 184 is applied at the root or base of each tab 188. A third color zone 186 is formed adjacent the butt edge of each tab. The color zone 184 and the color zone 186 are shown to occupy an area spanning about half the width of each tab 188. Again, one color zone 184 or 186 may occupy more than a majority of the surface area of the tab 188. The granule colors or shades chosen for deposit in the zones 182–186 may be of the same general hue, but of different shades. Alternatively, the colors may be selected as different hues, but yet being complementary so as to produce a pleasing aesthetic effect. While the plural color bands shown in FIG. 6c extend in lengthwise bands across the layer 174, the different color zones may alternatively extend widthwise to achieve a different visual effect. As can be seen in FIG. 6c, the space between the middle tab and the right hand tab is approximately 1.25 of the breadith of the middle tab.

FIG. 6d illustrates the bottom layer 172 of the asphalt shingle 170. As previously described, the surface area 178 that is not exposed to the weather is typically coated or embedded with mixed waste granules. The bottom layer 172 can include a special color zone 190 extending the length thereof, and being of a substantially dark color. The color zone 190 is considered a shadow area which provides the visual effect of a thick shingle, thereby simulating the wood-type shingles. The lower layer 172 also includes three additional color zones in the weather-exposed surface areas thereof. The three color zones are identified by reference numerals 192, 194 and 196.

Note that in all of the embodiments of the current invention, different numbers of color zones can be employed on each layer, and the colors can repeat after skipping one or more zones. Alternatively, the colors can be completely random and repeat or reoccur at random intervals. In still other embodiments, the granules of one layer can be of a single color or mixture to provide additional contrast with adjacent layers. Also note, that while the shingle of FIGS. 6a–d has a ply arrangement similar to the shingle of FIG. 3b, the unique color combinations comprising the current invention can be applied to any of the ply arrangements previously described.

Figure 7A:
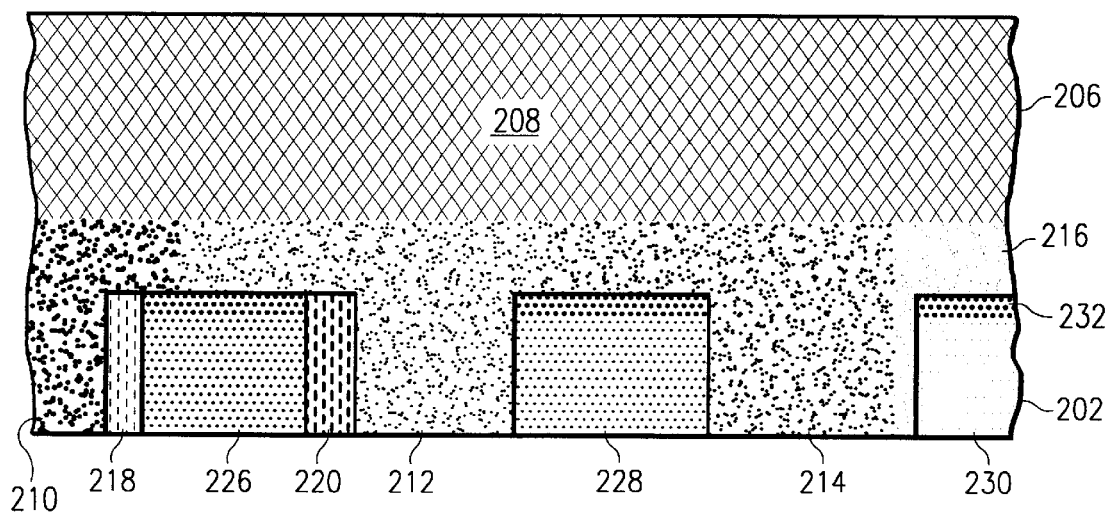
FIG. 7a is a portion of a composite three-layer shingle having lengthwise distributed color zones on the weather-exposed areas of each layer.
Figure 7B:
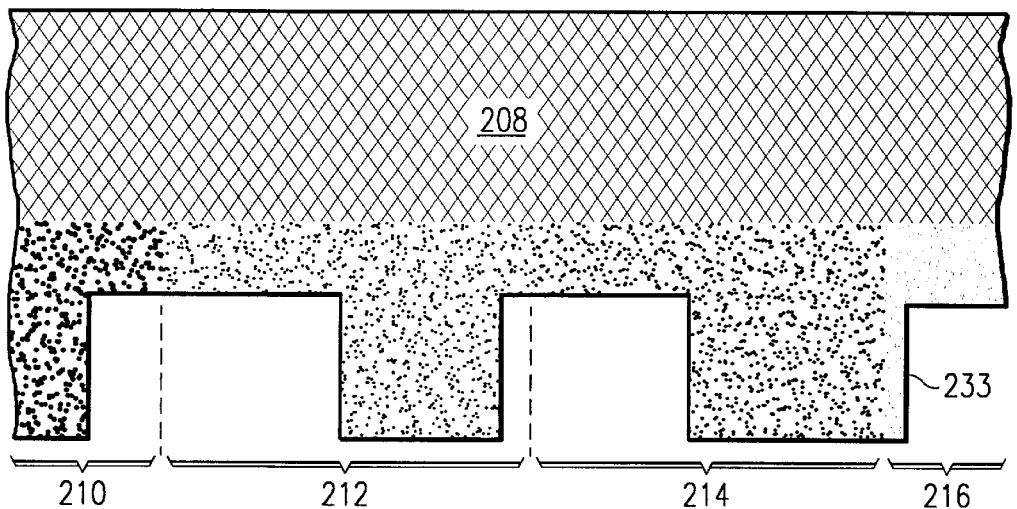
FIGS. 7b–d illustrate the respective top, middle and bottom layers of the composite shingle of FIG. 7a with the different granule color combinations shown with respect to each layer.
Figure 7C:
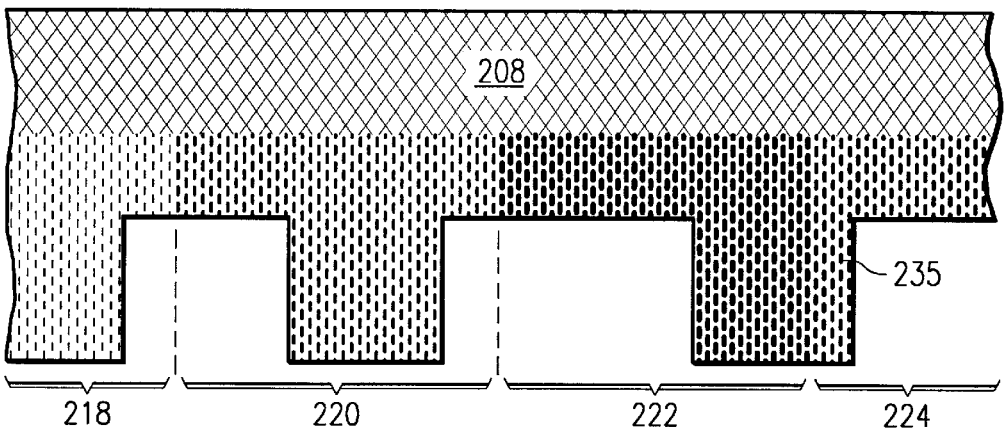
Figure 7D:
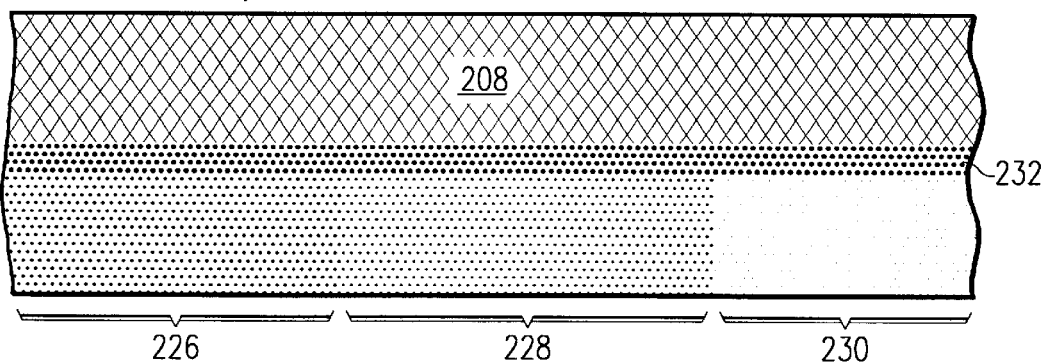

FIG. 7a, in conjunction with FIGS. 7b–d, illustrate yet another embodiment of the current invention in which the color zones (each of which is defined by an area of mineral granules having a uniform color distribution as previously described) are distributed lengthwise in a random sequence across each shingle ply. The lengthwise distribution of the color zones corresponds to the direction of movement of the shingle stock along the production line. The color zones in this embodiment can be formed as the asphalt impregnated shingle stock on the production line passes beneath an array of granule dispensers which drop the colored mineral granules onto the exposed asphalt of the shingle stock. The granule dispensers are controlled by a computer or other timing device to form a sequence of discrete color zones having a random or pseudo-random order. A pseudo-random color sequence is a sequence which appears to be random but which actually has some constraints, such as a sequence that avoids having two successive color deposits of the same color.

The color zones initially deposited on the shingle stock by the granule dispensers may be either contiguous or non-contiguous to one another. Where non-contiguous color zones are initially deposited, the surface of the shingle stock may subsequently be deposited with backfall granules which will only adhere to the areas which did not receive an initial color zone. The backfall granules typically comprise a mixture of the granules used in the other color zones. The backfall mixture thus forms new color zones between the original color zones.

FIG. 7a illustrates a portion of a three-ply asphalt shingle 200 having layers with tabs and cut-outs arranged similar to the shingle of FIG. 2a, and, in particular, having a random lengthwise relationship between the tabs of the top and middle layers. Shingle 200 includes a bottom layer 202 shown in more detail in FIG. 7d, a middle layer 204, shown in more detail in FIG. 7c, and a top layer 206 shown in more detail in FIG. 7b. The double diagonal cross-hatch pattern shown in FIGS. 7a–d represents non-weather-exposed areas 208. As previously discussed, such non-weather-exposed areas 208 are covered by other plies or other courses of shingles after the shingles have been assembled and installed on the roof, therefore, the color of the mineral granules in the non-weather-exposed areas 208 is immaterial to the look of the shingle. For reasons of economy, mixed waste granules are typically used in non-weather-exposed areas 208.

Referring now to FIG. 7b, the top layer 206 of the three-layer asphalt shingle includes four color zones 210, 212, 214, 216. It should be noted that the symbolic color designations shown in FIGS. 7a–d do not depict any specific colors and/or shades of mineral granules, rather only depict one distinguishable color or shade of granules from another. The color zones 210, 212, 214, 216 are deposited on upper ply 206 in a random or pseudo-random sequence, that is, the color of each successive color zone is selected at random from a first group of colors assigned to upper ply 206. Note that if backfall color zones are used, then two non-adjacent color zones in FIG. 7b, such as zones 210 and 214, or such as zones 212 and 216, will both be the same color separated by intervening color zones of different colors. In the preferred embodiment, the first group of colors for the color zones of upper ply 206 comprises four distinguishable colors (one of which colors can be the backfall mixture), however the first group could obviously comprise a different number of colors without departing from the scope of the invention. As previously described, in the preferred embodiment, the colored granules comprising the color zones 210, 212, 214, 216 are deposited only along the weather-exposed area of the ply (or areas that may be weather-exposed, depending on placement of overlying tabs), with the remainder of upper ply 206 comprising non-weather-exposed area 208 which may have mineral granules of any color.

The middle ply 204 shown in FIG. 7c comprises color zones 218, 220, 222, 224, in addition to a non-weather-exposed area 208. Again, note that some portions of the color zones of the middle and bottom layers shown in FIGS. 7c, 7d are actually non-weather exposed areas, since they are subsequently covered by the tabs of overlying layers. However, for purposes of illustration, the color zones in FIGS. 7c, 7d are shown as they exist prior to assembly of the shingle. As shown in FIG. 7a, the weather-exposed area of the shingle is generally defined as those areas visible on an assembled shingle below (in a width-wise direction) the nail zone. As with upper ply 206, the colored mineral granules forming the color zones are distributed in a random sequence lengthwise along the ply to create the color zones 218, 220, 222, 224 as shown. As previously described, a backfall mixture can be used for every second color zone if desired. The colors for the color zones in middle ply 204 are selected from a second group of colors (one of which colors can be the backfall mixture) which may or may not be the same as the first group of colors available for upper ply 206. In the shingle shown in FIGS. 7a–d, color zones 210 (top ply) and 222 (middle ply) utilize the same colored granules, as do color zones 216 (top ply) and 220 (middle ply), whereas color zones 212, 214 (both top ply), 218, 224 (both middle ply) utilize color granules that are not common in the color groups used for the two plies 204, 206. Obviously, a different combination of colors for the granules of the first group and second group could be used without departing from the scope of the invention.

FIG. 7d illustrates the bottom ply 202 of the three-ply shingle 200. The bottom layer 202 includes color zones 226, 228 and 230, a shadow area color zone 232 formed of darker granules, and a non-weather-exposed area 208 formed of granules having any convenient color. As with the previously described top and middle plies 206, 204, bottom ply 202 has color zones which are distributed in a random or pseudo-random sequence lengthwise along the ply. The colors of the mineral granules for the color zones on lower ply 202 are selected from a third group of colors (one of which colors can be the backfall mixture) which may be the same or may be different from the colors in the first and second color groups utilized in the top and middle plies. In this embodiment shown in FIGS. 7a–d, color zone 226 shares a common color with color zones 210 (top ply) and 222 (middle ply), color zone 228 shares a common color with color zone 214 (top ply), and color zone 230 shares a common color with color zone 212 (top ply). As is also readily apparent, the lengthwise extent of each color zone may be randomly varied to provide different numbers and combinations of color zones on each shingle.

Referring again to FIG. 7a, the three-ply shingle 200 is shown after the assembly of its constituent plies 202, 204 (under ply 206) and 206. After assembly, many of the color zones, including zones 210, 212, 214, 216, 218, 220, 226, 228 and 230 are visible on weather-exposed areas of the shingle, as is the shadow line color zone 232. However, in the embodiment shown in FIG. 7a, some color zones, such as zones 222 and 224 on tab 235 of middle ply 204, are not visible since they are covered by a tab 233 of the top ply 206. This random exposure or concealment of color zones on the middle layer of the shingle ensues that each shingle has a different appearance from other shingles.

Referring now to FIG. 7e, an alternative embodiment, similar to FIG. 7a, of a three-ply shingle is shown. Importantly, three-ply shingle 240 has tabs 242 on upper ply 206 which are shorter in the widthwise direction than the tabs 244 on middle ply 204, thereby resulting in additional portions of middle ply 204 becoming weather-exposed areas. For example, shingle 240 in FIG. 7e displays the same color zones 210, 212, 214, 216, 218, 220, 226, 228, 230 and a shadow line 232 as did shingle 200 of FIG. 7a, and in addition displays color zones 222 and 224 which were not visible on the shingle of FIG. 7a. In addition, the shape of the weather-exposed areas can now be rectangular, L-shaped or U-shaped rather than simply rectangular as in the embodiment of FIG. 7a.

Figure 8A:
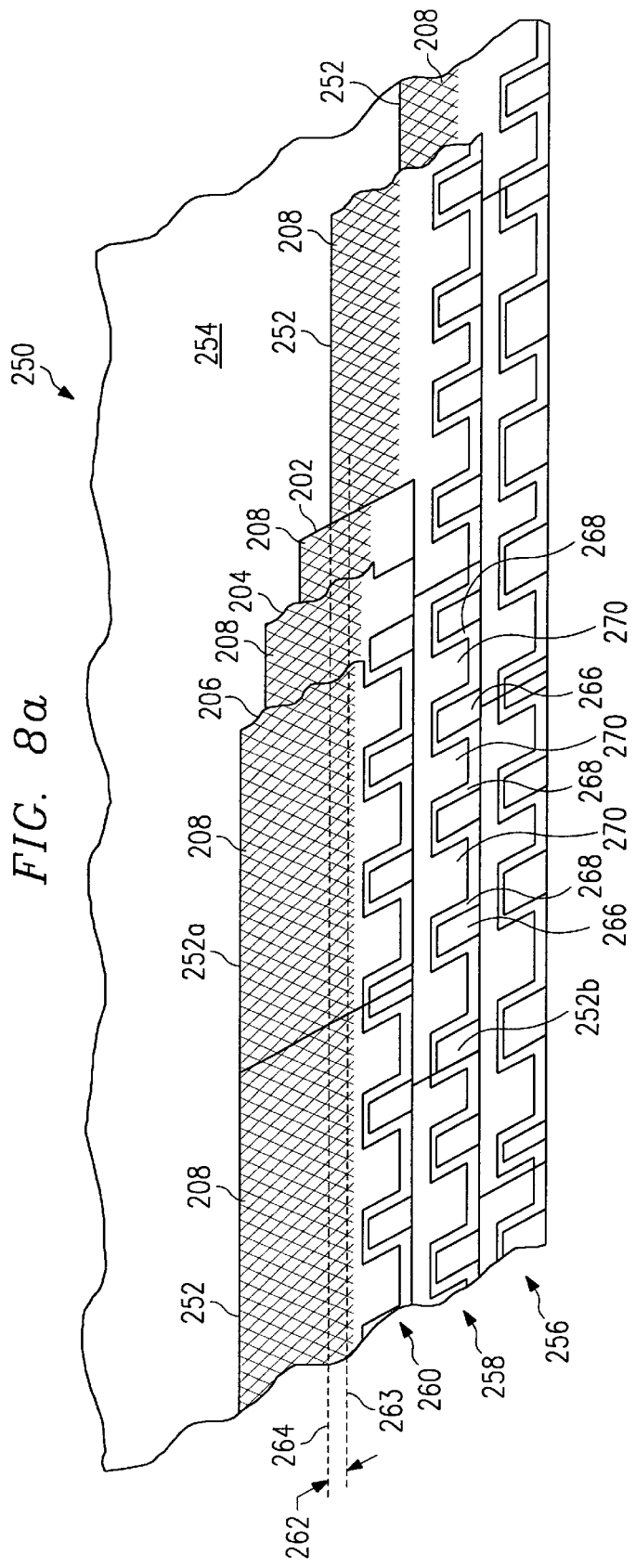
FIG. 8a is a roof for a building including a plurality of three-layer shingles having a weather-exposed area of each layer.

Another aspect of the current invention is a roof for a building having a unique combination of surfaces and colors thereby providing an attractive visual appearance. FIG. 8a shows a portion of a roof 250 which could be used on a house, apartment building, or other residential or commercial structure. The roof 250 is comprised of a plurality of multi-laminate roofing shingles 252, 252a and 252b installed over a roofing substrate 254. Each multi-laminate shingle 252, 252a and 252b includes a bottom ply 202, an intermediate or middle ply 204, and a top ply 206 which are assembled to one another to form unitary shingle 252 as previously described. In the shingle shown in FIG. 8a, the configuration of the plies of the shingle are similar to the shingle of FIG. 3d; however, other configurations of shingles disclosed above could be used without departing from the scope of the current invention.

In FIG. 8a, the shingle denoted by reference number 252a has a portion of the top ply 206 and the middle ply 204 broken away to reveal the non-weather-exposed areas 208 of the underlying plies. Three courses, or horizontal rows, of shingles 252 are shown in FIG. 8a; the first, second, and third course being designated by reference numerals 256, 258 and 260, respectively. The nail zone 262 for the third course 260 of shingles is shown between the two broken lines denoted with reference numerals 263 and 264. The shingle denoted by reference numeral 252b shows a typical shingle in second course 258 which has been installed over the non-weather-exposed areas of the shingles in first course 256 and which, in turn, has had shingles from the third course 260 installed over its own non-weather-exposed surfaces; thus only the weather-exposed areas of shingle 252b are visible on the roof structure 250. The weather-exposed areas on shingle 252b and similar fully installed shingles includes the bottom ply weather-exposed areas 266, the middle ply weather-exposed areas 268, and the upper ply weather-exposed areas 270. Depending upon the design of the shingle, the weather-exposed areas 266, 268, and 270 for a particular layer may either be discrete from similar areas or contiguous with similar layers on the same shingle. On the shingle designated as 252b in FIG. 8a, the lower ply weather-exposed areas 266 are discrete from one another, while the middle and upper ply weather-exposed areas 268 and 270 are continuous along the length of the shingle. It should be noted that while the foregoing embodiment of roof 250 has been described in conjunction with shingles 252 having square or rectangular shaped tabs, shingles having many other tab shapes can also be utilized, including trapezoidal, triangular, or randomly shaped, without departing from the scope of the current invention. Similarly, while the shingles 252 in this embodiment of roof 250 have a tab pattern which appears continuous with respect to adjoining shingles, shingles having discontinuous or random tab patterns with respect to adjoining shingles can also be utilized.

Referring now also to FIG. 8b, a building roof 250 is shown, similar to FIG. 8a, showing the distinct color zones present on the weather-exposed areas of the individuals shingles 252, 252a and 252b. In this embodiment, the color zones in the top and bottom ply are distributed lengthwise in an random sequence across each shingle ply as previously disclosed for FIGS. 7b and 7d, while a single color zone is used for the middle ply. However, other color arrangements could be used without departing from the scope of the current invention. In FIG. 8b, the different colors of the color zones are represented by different patterns in the weather-exposed areas of the shingles. For example, reference numerals 272 and 273, respectively, denote distinct color zones on the weather-exposed surface of the upper ply of shingle 252b. Similarly, reference numeral 275 denotes a different color zone on the weather-exposed area of the middle ply. Reference numerals 277, 278, and 279 represent different color zones on the bottom ply of shingle 252b. All of the shingles 252 and 252a surrounding shingle 252b have a different random arrangement of color zones on their weather-exposed surfaces. Thus, no two contiguous shingles 252, 252a, or 252b, will present the same look to an observer. These random variations between shingles result in a non-repeating appearance for roof 250 which is very desirable in the roofing industry. Referring still to both FIGS. 8a and 8b, it will be further noted that the lengthwise dimension and placement of the tabs on each of the shingles 252, 252a, and 252b on roof 250 may be randomly varied, which along with the variation in the sequence of color zones, yields an even larger number of random or pseudo-random variations in the appearance of each shingle.

Figure 9B:
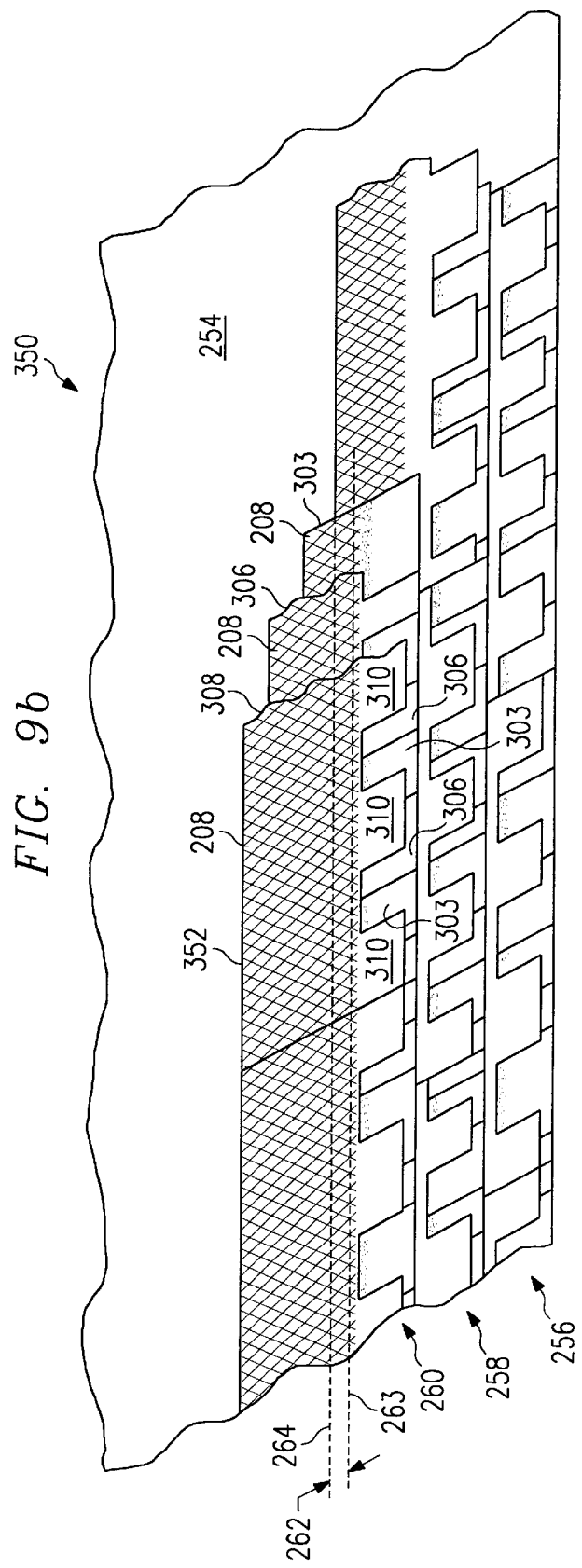
FIG. 9b is a roof, similar to FIG. 9a, but with the tabs of the top layers of the shingles being shorter widthwise than the tabs of the middle layer.

FIG. 9a illustrates another embodiment of the invention, a building roof 300 comprising a plurality of three-ply shingles 302 installed over a roofing substrate 254. Roof 300 is similar to roof 250 in FIG. 8a, with each of the three-ply shingles 302 having a bottom ply 303, a middle ply 304 with tabs 306, and a top ply 308 with tabs 310. Importantly, however, in shingles 302 the lengthwise positional and dimensional relationship between the tabs 306, 310 of the two plies 304, 308 is random. This produces weather-exposed areas on layers 303, 304 and 308 similar in shape to the shingles of FIG. 2a. FIG. 9b illustrates yet another embodiment of the invention, a building roof 350, comprising a plurality of shingles 352 installed over a roofing substrate 254. Roof 350 is similar to FIG. 9a, except that the three-ply shingles 352 have tabs 310 of top ply 308 which are shorter in the widthwise direction than the tabs 306 of middle ply 304, producing weather-exposed areas on the shingle having an appearance similar to the shingles of FIG. 2b. To better illustrate the shingle structure on the roofs 300 and 350 of FIGS. 9a, 9b, the color zones are not shown; however, it will be readily apparent that the placement of color zones on the individual layers of the shingles comprising roof 300 and 350 can be similar to that shown in FIG. 8b or can be as described in any of the foregoing description.

While the foregoing illustrates the different color schemes utilized in accordance with the disclosed embodiments, those skilled in the art may prefer to employ yet other color schemes. In addition, the different color schemes illustrated in FIGS. 6a–d, FIGS. 7a–e, and FIG. 8b can be readily employed in all of the embodiments described above. As can be appreciated, many different combinations of color zones and colors can be utilized to provide a host of different color combinations and visual effects. It should also be noted that while the foregoing embodiments have been described in conjunction with a square or rectangular shape tab, many other tab shapes can be utilized, including the popular dragon tooth. It can also be readily appreciated that the various embodiments disclosed herein can be fabricated utilizing current asphalt shingle fabricating equipment, including the type disclosed in U.S. Pat. Nos. 4,775,440; 4,352,837; 5,369,929; 4,233,100; and 4,900,589, the disclosures of which are incorporated herein by reference. The actual assembly line machinery contemplated for fabricating the three-ply asphalt shingles described above is not considered a part of the present invention.

The previously described aspects of the current invention relate to a three-layer asphalt shingle, or a roof comprising such shingles. Yet another aspect provides a two-ply asphalt shingle having an extended nail zone. FIG. 10 illustrates a two-ply asphalt shingle 400 having a bottom layer 402 and a top layer 404. The shingle 400 is characterized by a head edge 406 and an opposing butt edge 408. The distance between such edges 406, 408 defines a width of shingle 400 (denoted by reference numeral 410). The distance between the remaining two opposing edges, shown as reference numerals 412 and 414, defines a length of the shingle (denoted by reference numeral 416). The shingle 400 is preferably constructed according to one of various length and width standards as previously described for the three-layer shingle. The basic construction of each layer is essentially the same as for the three-layer shingle as well. The top layer 404 of shingle 400 has numerous tabs 418 formed by a series of cut-out areas 420. Importantly, the width of the bottom layer (denoted by reference numeral 422) is less than the width 410 of the entire shingle, but greater than about 55% of the width 410 of the entire shingle.

The nail zone (denoted by reference numeral 424) of the shingle in FIG. 10 is defined by the head edge of bottom ply 402 (denoted by broken line 426) and the edge of the weather-exposed area of the shingle (denoted by broken line 428). The weather-exposed line 428 is positioned at least 5 inches from the butt edge 408 of the shingle. To provide an extended nail zone, the bottom layer 402 has a width 422 within the range of about 55% to about 85% of the width 410 of the entire shingle. In a preferred embodiment, the width 422 is within the range of about 55% to about 60% of the width 410 of the shingle. In a more preferred embodiment, the width 422 is about 58% of the width 410 of the shingle. In such embodiments, the nail zone 24 will have a width greater than about one inch.

In another embodiment, nail zone 24 will have a width within the range of about 15% to about 18% of the width 410 of the entire shingle. As with the three-ply shingles previously described, the extended nail zone 24 of the current invention reduces the likelihood of mis-nailing during installation of the shingle 400, thereby resulting in a better quality roofing cover.

From the foregoing, disclosed is an asphalt shingle construction that enhances a depth or vertical feature of the shingle to thereby more closely simulate wood-type shingles. Also, the disclosed asphalt shingle provides a large variety and combinations of color zones to produce a highly randomized feature. Also, the multiple layers and the different shapes and sizes of the tabs, as well as the randomness thereof, further enhances the visual and aesthetic features of the shingle.

Thus, there is disclosed a multiple-ply asphalt shingle that overcomes the shortcomings and disadvantages of the prior art shingles. While the foregoing embodiments of the invention have been disclosed with reference to specific shingle layer structures and color patterns, it is to be understood that many changes in detail may be made as a matter of design choices, without departing from the spirit and scope of the invention, as defined by the appended claims.

We claim:

1. A shingle, comprising:
 a bottom ply having a butt edge and a head edge;
 an intermediate ply having a butt edge and a head edge, said intermediate ply overlying a portion of said bottom ply and having said head edge extending beyond the head edge of said bottom ply;
 a top ply having a butt edge and a head edge, said top ply overlying a portion of said intermediate ply and having said head edge extending beyond the head edge of said intermediate ply;
 wherein said bottom, intermediate, and top plies each include a weather-exposed surface;
 wherein each of said intermediate and top plies have cutouts formed in a butt edge thereof to thereby define a plurality of corresponding intermediate tabs and top tabs and a plurality of corresponding intermediate cutouts and top cutouts,
 wherein said top tabs are positioned relative to said intermediate tabs so as to lie only on said intermediate tabs.

2. A trilaminated shingle comprising:
(a) an anterior layer consisting essentially of a rectangular, granular surfaced shingle sheet having an undivided headlap portion and a butt portion comprising a plurality of tabs of a given average breadth separated by spaces;
(b) a middle layer consisting essentially of a longitudinally coextensive rectangular, granular surfaced shingle sheet of an overall width up to equal the width of the anterior layer, having the same number of tabs as those of (a), said tabs of (b) larger in breadth and/or height with respect to the tabs of (a) but narrower than the spaces between the tabs of (a), said middle layer being attached to the undersurface of said anterior layer in a manner such that the tabs of (b) are positioned under the tabs of (a) and extend from a side and/or bottom edge of tab (a) when assembled and partially fill the side spaces between the tabs of (a); and
(c) a posterior layer of an undivided, longitudinally coextensive rectangular strip exposable through and completely filling lateral spaces between said mated tabs of (a) and (b) and having granules on its surface in at least its exposed areas, said strip having a width greater than the height of the tabs of (b) and being mounted on the undersurface of at least one of (b) or (a) and (b).

* * * * *

UNITED STATES PATENT AND TRADEMARK OFFICE
CERTIFICATE OF CORRECTION

PATENT NO. : 6,933,037 B2 Page 1 of 1
DATED : August 23, 2005
INVENTOR(S) : Leonard D. McCumber et al.

It is certified that error appears in the above-identified patent and that said Letters Patent is hereby corrected as shown below:

Column 2,
Line 17, delete "stip" and insert -- strip --.

Signed and Sealed this

Twenty-fifth Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,933,037 B2
DATED : August 23, 2005
INVENTOR(S) : Leonard D. McCumber et al.

It is certified that error appears in the above-identified patent and that said Letters Patent is hereby corrected as shown below:

Column 2,
Line 17, delete "stip" and insert -- strip --.

Column 3, line 43 - Column 4, line 12,

Delete " shingle 10 is fabricated with a first or bottom (i.e., posterior) layer or ply 12, a second, middle or intermediate layer 14 and a third or top (i.e., anterior) layer 16. The shingle 10 is characterized by a head edge 18 (oriented toward the top of the roof during installation) and an opposing butt edge 20, the distance between such edges 18 and 20 defining a width of the shingle 10. The distance between the shorter opposing edges of the shingle 10, shown as reference numerals 22 and 23, define a length of the shingle 10. The shingle 10 is preferably constructed to one of various width and length standards, such as about 12 inchesX36 inches, known as a "standard" shingle or approximately 13 1/4 inchesX39 3/8 inches, known as a "metric" shingle. Each ply is preferably, although not necessarily, of the same thickness, such as about 3/16 inch. As can be appreciated, with each of the three layers being about 3/16 inch in thickness, the total thickness of the asphalt shingle 10 is about 9/16 inches. Of course, the shingle 10 can be constructed with different lengths and/or widths to accommodate the building standards that are followed in the different regions, territories or countries. The basic preferred construction of each layer is essentially the same, including a reinforcing mat or web, with an asphalt coating on both sides thereof, and with a layer of mineral granules embedded in at least a portion on the upper surface. For purposes of illustration, in FIGS. 1a-5 the mineral granules are shown covering only portions of the layers. The reinforcing mat is typically constructed of fiber glass, but may also be constructed of asphalt saturated organic felt, polyester, or other fibers or films as are known in the art. Those skilled in the art can readily appreciate that shingle 10 can be constructed with a standard roll-type fiber glass material which progresses through various stations to be coated with a hot asphalt liquid, cooled, impregnated with granules and cut into separate layers having various patterns, and then the layers are over-lapped with each other and bonded or laminated together to form a ".

Column 6,
Line 57, after "The asphalt" insert the following -- shingle 10 is fabricated with a first or bottom (i.e., posterior) layer or ply 12, a second, middle or intermediate layer 14 and a third or top (i.e., anterior) layer 16. The shingle 10 is characterized by a head edge 18 (oriented toward the top of the roof during installation) and an opposing butt edge 20, the distance between such edges 18 and 20 defining a width of the shingle 10. The distance between the shorter opposing edges of the shingle 10, shown as reference numerals 22 and 23, define a length of the shingle 10. The shingle 10 is preferably constructed to one of various width and length standards, such as about 12 inchesX36 inches, known as a "standard" shingle or approximately 13 1/4 inchesX39 3/8 inches, known as a "metric" shingle. Each ply is preferably, although not necessarily, of the same thickness, such as about 3/16 inch. As can be appreciated, with each of the three layers being about 3/16 inch in thickness, the total thickness of the asphalt shingle 10 is about 9/16 inches. Of course, the shingle 10 can be constructed with different lengths and/or widths to accommodate the building standards that are followed in the different regions, territories or countries. The basic preferred construction of each layer is essentially the same, including a reinforcing mat or web, with an asphalt coating on both sides thereof, and with a layer of mineral granules embedded in at least a portion on the upper surface. For purposes of illustration, in FIGS. 1a-5 the mineral granules are shown covering only portions of the layers. The reinforcing mat is typically constructed of fiber glass, but may also be constructed of asphalt saturated organic felt, polyester, or other fibers or films as are known in the art. Those skilled in the art can readily appreciate that shingle 10 can be constructed with a standard roll-type fiber glass material which progresses through various stations to be coated

UNITED STATES PATENT AND TRADEMARK OFFICE
CERTIFICATE OF CORRECTION

PATENT NO.    : 6,933,037 B2
DATED         : August 23, 2005
INVENTOR(S)   : Leonard D. McCumber et al.

It is certified that error appears in the above-identified patent and that said Letters Patent is hereby corrected as shown below:

Column 6 (cont'd), with a hot asphalt liquid, cooled, impregnated with granules and cut into separate layers having various patterns, and then the layers are over-lapped with each other and bonded or laminated together to form a --.

Signed and Sealed this

Eighteenth Day of April, 2006

JON W. DUDAS
*Director of the United States Patent and Trademark Office*